United States Patent
Natu et al.

(10) Patent No.: US 10,379,768 B2
(45) Date of Patent: Aug. 13, 2019

(54) SELECTIVE MEMORY MODE AUTHORIZATION ENFORCEMENT

(71) Applicant: INTEL CORPORATION, Santa Clara, CA (US)

(72) Inventors: Mahesh S. Natu, Sunnyvale, CA (US); Vedaraman Geetha, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/283,074

(22) Filed: Sep. 30, 2016

(65) Prior Publication Data
US 2018/0095692 A1    Apr. 5, 2018

(51) Int. Cl.
*G06F 3/06* (2006.01)
*G06F 12/14* (2006.01)
*G06F 12/0802* (2016.01)
*G06F 12/0868* (2016.01)

(52) U.S. Cl.
CPC ............ *G06F 3/0634* (2013.01); *G06F 3/061* (2013.01); *G06F 3/0604* (2013.01); *G06F 3/0685* (2013.01); *G06F 12/1416* (2013.01); *G06F 12/1458* (2013.01); *G06F 12/0802* (2013.01); *G06F 12/0868* (2013.01);
(Continued)

(58) Field of Classification Search
CPC .. G06F 12/14; G06F 12/1416; G06F 12/1458; G06F 12/1466; G06F 12/1475; G06F 12/1491; G06F 21/805; G06F 21/78; G06F 21/79; G06F 21/80
See application file for complete search history.

(56) References Cited

U.S. PATENT DOCUMENTS

| 8,301,907 | B2  |    | 10/2012 | Natu et al. |             |
|-----------|-----|----|---------|-------------|-------------|
| 8,572,345 | B2  | *  | 10/2013 | Moyer       | G06F 12/1483 |
|           |     |    |         |             | 711/152     |

(Continued)

OTHER PUBLICATIONS

Wikipedia, "Uncore", [online], last modified on Jul. 31, 2015, [Retrieved on Sep. 5, 2016], Retrieved from the Internet at <URL: http://en.wikipedia.org/wiki/uncore>, 2 pp.
(Continued)

*Primary Examiner* — Midys Rojas
*Assistant Examiner* — Khoa D Doan
(74) *Attorney, Agent, or Firm* — Konrad Raynes Davda & Victor LLP

(57) ABSTRACT

In one embodiment, a memory interface employs selective memory mode authorization enforcement in accordance with the present description to ensure that memory modes of operation which have not been authorized, are not permitted to proceed. In one embodiment, mode control logic receives from memory control logic of the memory interface, memory mode selection data which is compared to a mode authorization classification structure to determine if the memory mode being selected in association with a memory transaction request is authorized or otherwise permitted. Memory mode enablement logic of the mode control logic enables the requested memory mode associated with a memory transaction request if it is determined that the selected memory mode associated with the memory transaction request is authorized. Other aspects are described herein.

23 Claims, 8 Drawing Sheets

(52) U.S. Cl.
CPC ........... *G06F 2212/1016* (2013.01); *G06F 2212/1052* (2013.01); *G06F 2212/214* (2013.01)

(56) References Cited

U.S. PATENT DOCUMENTS

| | | | |
|---|---|---|---|
| 8,683,115 B2* | 3/2014 | Balasubramanian | H03K 19/0016 711/103 |
| 8,954,696 B2* | 2/2015 | Gremaud | G06F 21/64 711/163 |
| 9,342,453 B2* | 5/2016 | Nale | G06F 12/0868 |
| 2003/0135706 A1* | 7/2003 | Lin | G06F 21/6209 711/163 |
| 2004/0019754 A1* | 1/2004 | Lin | G06F 12/1433 711/156 |
| 2004/0143714 A1* | 7/2004 | Watt | G06F 12/1491 711/163 |
| 2007/0094468 A1* | 4/2007 | Haustein | G06F 21/6218 711/163 |
| 2007/0094469 A1* | 4/2007 | Haustein | G06F 3/0623 711/163 |
| 2010/0106954 A1* | 4/2010 | Muchsel | G06F 21/71 713/2 |
| 2011/0264880 A1* | 10/2011 | Ylonen | G06F 12/0261 711/162 |
| 2012/0215989 A1* | 8/2012 | Moyer | G06F 12/1416 711/145 |
| 2014/0006739 A1* | 1/2014 | Dixon | G06F 12/14 711/163 |
| 2014/0189261 A1* | 7/2014 | Hildesheim | G06F 12/1027 711/152 |
| 2014/0325176 A1* | 10/2014 | Messina | G06F 12/1433 711/164 |
| 2015/0317259 A1* | 11/2015 | Zbiciak | G06F 13/366 711/163 |
| 2015/0381368 A1 | 12/2015 | Stevens, Jr. et al. | |
| 2017/0177447 A1* | 6/2017 | Golander | G06F 11/1464 |
| 2018/0190350 A1* | 7/2018 | Connor | G11C 13/004 |

OTHER PUBLICATIONS

U.S. Appl. No. 15/720,659, "Memory Control Management of a Processor", invented Dy M.S. Natu et al., filed Sep. 29, 2017, 31 pp.

* cited by examiner

| Memory Mode Selection Data | | Memory Mode |
| --- | --- | --- |
| BIT1 | BIT0 | |
| 0 | 1 | Volatile Read/Write Memory Mode |
| N/A | N/A | Storage Mode |
| N/A | N/A | Non-volatile Application Direct Mode |
| 1 | 1 | Volatile Application Direct Mode |
| 0 | 0 | ALL MODES AUTHORIZED |

FIG. 4A

| Memory Mode Selection Data | | | Memory Mode |
| --- | --- | --- | --- |
| BIT2 | BIT1 | BIT0 | |
| 0 | 0 | 1 | Volatile Read/Write Memory Mode |
| 1 | N/A | N/A | Storage Mode |
| 0 | N/A | N/A | Non-volatile Application Direct Mode |
| 0 | 1 | 1 | Volatile Application Direct Mode |
| 0 | 0 | 0 | ALL MODES AUTHORIZED |

FIG. 4B

SELECTIVE MEMORY MODE AUTHORIZATION ENFORCEMENT

TECHNICAL FIELD

Certain embodiments of the present description relate generally to management of memory resources.

BACKGROUND

A non-volatile memory capable of storing a large amount of data frequently has drawbacks such slower input/output speeds as compared to volatile, smaller capacity memories. Conversely, smaller, volatile memories which may be faster to operate, may have a greater cost to store data on a per bit basis, as compared to larger capacity non-volatile memories. Further, data stored in a volatile memory may be lost in the event of a loss of power or a system reset. Accordingly, computer systems may employ a two-level memory system, often referred to as a "heterogeneous" memory system employing a smaller, faster volatile memory as a cache memory for a second, larger and frequently slower memory which may be a non-volatile memory.

BRIEF DESCRIPTION OF THE DRAWINGS

Embodiments of the present disclosure are illustrated by way of example, and not by way of limitation, in the figures of the accompanying drawings in which like reference numerals refer to similar elements.

FIGS. 4a, 4b depict embodiments of memory mode selection data associated with various memory modes of operation of a memory employing selective memory mode authorization enforcement in accordance with the present description.

DESCRIPTION OF EMBODIMENTS

Figure 1:
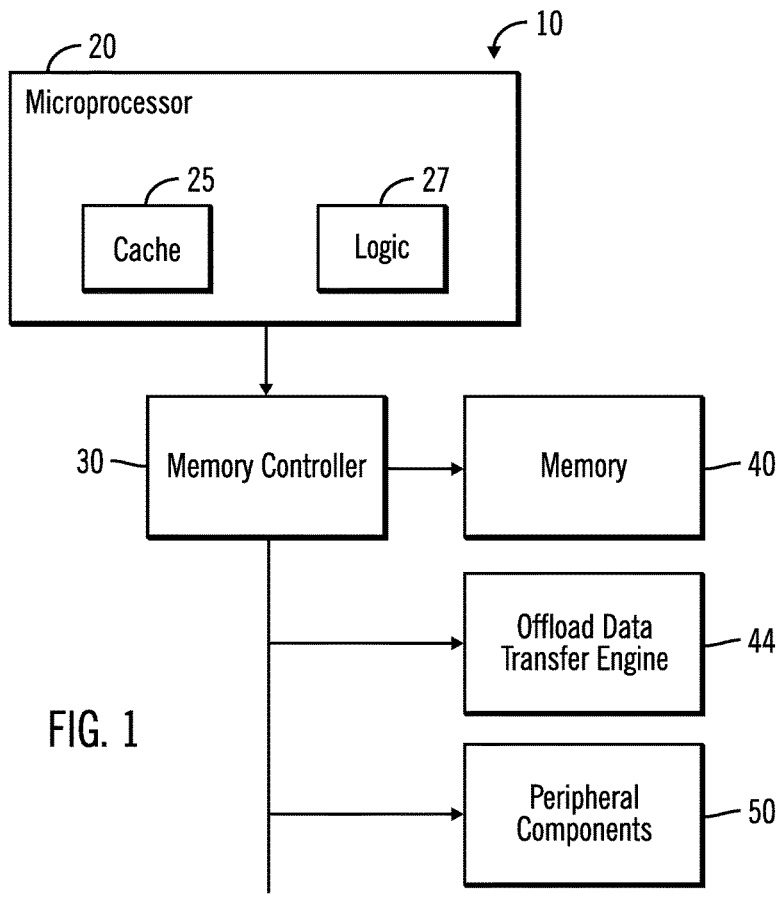
FIG. 1 depicts a high-level block diagram illustrating one embodiment of a system employing a memory having selective memory mode authorization enforcement in accordance with the present description.

In the description that follows, like components have been given the same reference numerals, regardless of whether they are shown in different embodiments. To illustrate one or more embodiments of the present disclosure in a clear and concise manner, the drawings may not necessarily be to scale and certain features may be shown in somewhat schematic form. Features that are described or illustrated with respect to one embodiment may be used in the same way or in a similar way in one or more other embodiments or in combination with or instead of features of other embodiments.

Some previously known integrated circuit devices such as a memory or a system on a chip (SoC) having both processors and a memory controller on one integrated circuit device, may support operating the device in different modes of operation, if authorized. In such devices, one or more modes of operation may be authorized for operation by setting hardware fuses on the device which enforces operation of the device in accordance with the fuse settings to prevent operation of the device in an unauthorized mode.

Other known integrated circuit devices such as a dual-in-line memory module (DIMM) on a separate integrated device die may also employ fusing on the DIMM die to enable various operating modes of the DIMM. For example, the settings of surface mount fuses for a DIMM may be reported to a central processing unit when the system is reset. Enforcement of the fuse settings reported to the central processing unit during the system reset is handled by the central processing unit to prevent operation of the DIMM in an unauthorized mode following the system reset.

It is appreciated herein that various memory modes of operation may not be readily distinguishable by known DIMM devices. Hence, in known DIMM devices, fuse settings on the DIMM may not prevent unauthorized use of some memory modes. It is further appreciated that reducing or eliminating participation by the central processing unit itself in enforcing memory mode authorizations may improve system performance.

Memory interface logic or other logic in accordance with one aspect of the present description employs selective memory mode authorization enforcement to ensure that memory modes of operation which have not been authorized, are not permitted to proceed. Accordingly, memory interface logic in accordance with one aspect of the present description, includes mode control logic which receives from memory control logic of the memory interface logic, memory mode selection data indicating a memory mode selected for the memory transaction request. The memory mode selection data may identify a particular mode of memory operation being requested in association with a particular memory transaction request such as a data read or write operation, for example.

In one aspect of the present description, the memory mode selection data received from the memory control logic is compared by memory mode authorization logic of the mode control logic, to a mode authorization classification structure to determine if the memory mode being selected in association with a memory transaction request is authorized or otherwise permitted. In one embodiment, a mode authorization classification structure for a memory mode may be implemented with a fuse which is burned or otherwise set to indicate whether an associated memory mode of operation is authorized. In another aspect, memory mode enablement logic of the mode control logic enables the requested memory mode associated with a memory transaction request if it is determined that the selected memory mode associated with the memory transaction request is permitted.

In one embodiment, a memory interface employing selective memory mode authorization enforcement in accordance with the present description may have a plurality of potential memory modes of operation including a volatile read/write memory mode, for example, in which data may be read from the memory in response to a memory read transaction request and in which data may be written to the memory in response to a memory write transaction request. Although the memory may be a nonvolatile memory in one embodiment, volatile behavior may be emulated when the volatile read/write memory mode is enabled. For example, mode control logic may restrict access to data written to the memory upon application of a reset to the system or upon application of a power cycle to the memory. It is appreciated that in other embodiments, a memory device may include both volatile and non-volatile memories in the same device. As such, the volatile memory may be utilized in a volatile mode of operation in the memory device. Similarly, the non-volatile memory may be utilized in a non-volatile mode of operation in the memory device.

In another example, the plurality of potential memory modes of operation of the memory may include a volatile application direct mode in which data may be read directly from a far memory in response to a memory read transaction request, instead of reading data cached in a near memory. Similarly, data may be written directly to a far memory in response to a memory write transaction request, instead of writing the data to a near cache memory. Thus, in an application direct mode, data is read directly from or written directly to a far memory without intermediate caching in a near memory. Although the memory may be a nonvolatile memory in one embodiment, volatile behavior may be emulated when the volatile application direct mode is enabled as described above in connection with the volatile read/write memory mode.

Another example of a memory mode of the plurality of potential memory modes of operation of the memory includes a storage mode in which data may be read from the memory in response to a memory block window register read transaction request. Similarly, data may be written to the memory in response to a memory block window register write transaction request. In another aspect of the present description, the memory mode enablement logic may disable the storage mode if the storage mode is not authorized as indicated by a mode authorization classification structure associated with the storage mode. For example, the memory mode enablement logic of the mode control logic can disable the storage mode associated with a memory block window register transaction request by preventing access to the memory via block window registers if it is determined that a storage mode associated with a memory block window register transaction request is not permitted.

Yet another example of a memory mode of the plurality of potential memory modes of operation of the memory includes a non-volatile application direct mode in which data may be read directly from a far memory in response to a memory read transaction request, instead of reading data cached in a near memory. In an embodiment in which the memory is a nonvolatile memory, the non-volatile application direct mode when authorized as indicated by a mode authorization classification structure associated with the non-volatile application direct mode, may implement the non-volatile behavior of the memory by permitting access to data written to the far memory notwithstanding application of a power cycle to the memory or a reset to the system, for example.

A memory interface employing selective memory mode authorization enforcement in accordance with the present description is described herein in connection with sectors of data, blocks of sectors and regions of blocks. However, it is appreciated that a memory interface in accordance with the present description may be applied to other units and sub-units of data such as volumes, tracks, segments, files, bytes, etc.

A memory interface having selective memory mode authorization enforcement in accordance with the present description may, in one embodiment, be employed in a system of one or more computers configured to perform particular operations or actions of selective memory mode authorization enforcement, by virtue of having software, firmware, hardware, or a combination of them installed on the system that in operation causes or cause the system to perform the actions. One or more computer programs can be configured to perform particular operations or actions of selective memory mode authorization enforcement, by virtue of including instructions that, when executed by data processing apparatus, cause the apparatus to perform the actions.

Other embodiments include corresponding computer systems, apparatus, and computer programs recorded on one or more computer storage devices, each configured to perform the actions of the methods. Implementations of the described techniques may include hardware, a method or process, or computer software on a computer-accessible medium.

Turning to the figures, FIG. 1 is a high-level block diagram illustrating selected aspects of a computing system implemented according to an embodiment of the present disclosure. System 10 may represent any of a number of electronic or other computing devices, that may include a memory device. Such electronic devices may include a cloud storage system and other computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). System 10 can be powered by a battery, renewable power source (e.g., solar panel), wireless charging, or by use of an AC outlet.

In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, an offload data transfer engine 44, and peripheral components 50 which may include, for example, video controller, input device, output device, storage, network adapter or interface, a power source (including a battery, renewable power source (e.g., photovoltaic panel), wireless charging, or coupling to an AC outlet), etc. The microprocessor 20 includes a cache 25 that may be part of a memory hierarchy to store instructions and data, and the system memory 40 may also be part of the memory hierarchy. The microprocessor 20 further includes logic 27 which may include one or more cores, and may include a system agent, for example. A core typically contains the components of the processor involved in executing instructions, such as an arithmetic logic unit (ALU), floating point unit (FPU), and/or various levels of cache (such as L1 and L2 cache), for example. A system agent may include various controllers such as serial or parallel data path controllers, various levels of cache (such as L3 cache) a snoop agent pipeline an on-die memory controller, and/or other logic. Communication between the microprocessor 20 and the memory 40 may be facilitated by a memory controller (or chipset) 30, which may also facilitate in communicating with the peripheral components 50. The memory controller 30 may be on-die with a component such as a microprocessor 20, an offload engine 44, a memory of the memory 40, or a component of the peripheral components 50, for example, or may be separate.

Peripheral components 50 which are storage devices may be, for example, non-volatile storage, such as solid-state drives (SSD), magnetic disk drives including redundant arrays of independent disks (RAID), optical disk drives, a tape drive, flash memory, etc. The storage may comprise an internal storage device or an attached or network accessible storage. The microprocessor 20 is configured to write data in and read data from the memory 40. Programs in the storage are loaded into the memory and executed by the processor. The offload data transfer engine 44 facilitates memory to memory data transfers which bypass the microprocessor to lessen the load of such transfers on the microprocessor 20. As explained in greater detail below, one embodiment of a memory interface having selective memory mode authorization enforcement in accordance with the present description, ensures that memory modes of operation which have not been authorized, are not permitted to proceed.

A network controller or adapter enables communication with a network, such as an Ethernet, a Fiber Channel Arbitrated Loop, etc. Further, the architecture may, in certain embodiments, include a video controller configured to display information represented by data in a memory on a display monitor, where the video controller may be embodied on a video card or integrated on integrated circuit components mounted on a motherboard or other substrate. An input device is used to provide user input to the processor, and may include a keyboard, mouse, pen-stylus, microphone, touch sensitive display screen, input pins, sockets, or any other activation or input mechanism known in the art. An output device is capable of rendering information transmitted from the processor, or other component, such as a display monitor, printer, storage, output pins, sockets, etc. The network adapter may embodied on a network card, such as a Peripheral Component Interconnect (PCI) card, PCI-express, or some other I/O card, or on integrated circuit components mounted on a motherboard or other substrate. The peripheral devices 50 may also include RF receiver/transmitters such as in a mobile telephone embodiment, for example. Additional examples of peripheral devices 50 which may be provided in the system include an audio device and temperature sensor to deliver temperature updates for storage in the memory.

One or more of the components of the device 10 may be omitted, depending upon the particular application. For example, a network router may lack a video controller, for example.

Any one or more of the memory devices 25, 40, and the other devices 10, 30, 50 may include a memory employing a memory interface having selective memory mode authorization enforcement in accordance with the present description, or be embodied as any type of data storage capable of storing data in a persistent manner (even if power is interrupted to non-volatile memory) such as but not limited to any combination of memory devices that use for example, chalcogenide phase change material (e.g., chalcogenide glass), 3D crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or another Spin Transfer Torque (STT)-MRAM as described above. Such memory elements in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Figures 2A, 2B, 2C, 2D:
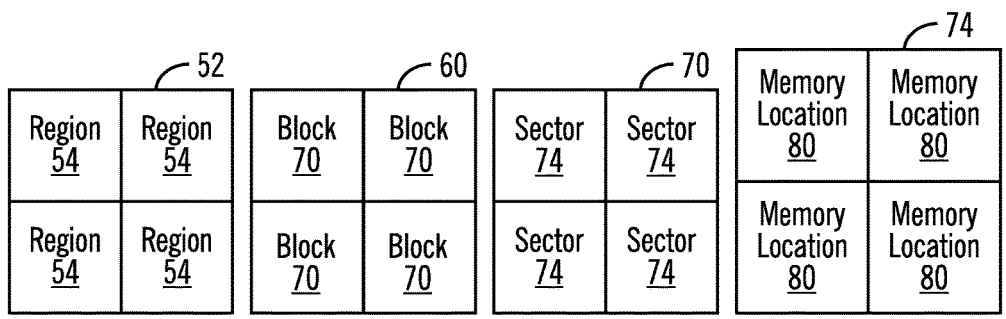
FIGS. 2a-2d depict various hierarchical levels of data storage of the memory of FIG. 1.

One or more of the memory 40 and storage devices of the peripheral devices 50 may have a rectangular or orthogonal array of rows and columns of cells such as bit cells in which each bit cell is configured to store a bit state. An array of bit cells may be logically subdivided in an array 52 of regions 54 (FIG. 2a). Depending upon the size of the memory, the array of bit cells may have tens, hundreds, thousands, or more of such regions 54. A region 54 may be logically subdivided in an array 60 of blocks 70 (FIG. 2b). Depending upon the size of the memory, the array of blocks may have tens, hundreds, thousands, or more of such blocks 70. In one embodiment, the memory 40 or storage device of the devices 50 may include a non-volatile memory such as a flash memory, for example, in which each block 70 represents the smallest subunit of the memory which may be erased at one time.

Each block 70 may in turn be subdivided into an array of sectors 74 (FIG. 2c). Depending upon the size of the memory, a block 70 of sectors 74 may have a single sector or tens, hundreds, thousands, or more of such sectors 74. Each sector 74 may in turn be subdivided into an array of memory locations 80 (FIG. 2d). Depending upon the size of the memory, a sector 74 of memory locations 80 may have tens, hundreds, thousands, or more of such memory locations 80. One specific example of a sector is sized sufficiently to store 512 bytes of data. Each memory location includes one or more bit cells to store a bit, a byte, a word or other subunit of data, depending upon the particular application. Although a memory interface in accordance with the present description is described in connection with storing data in a block of one or more sectors, it is appreciated that other units of data storage such as pages, tracks, segments, files, volumes, disks, drives, etc., may be utilized, depending upon the particular application.

Figure 3:
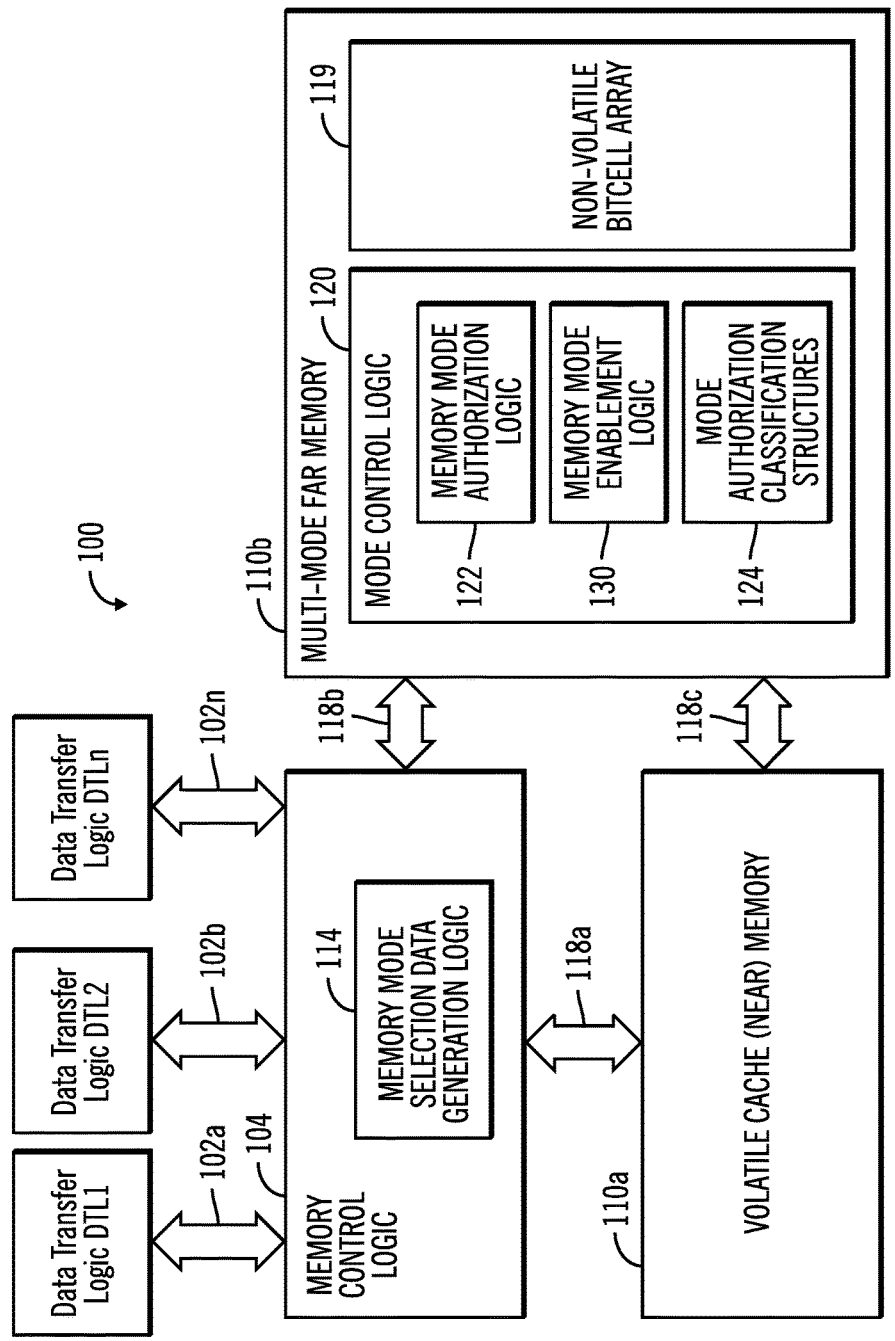
FIG. 3 depicts an embodiment of a memory interface employing selective memory mode authorization enforcement in accordance with the present description.

FIG. 3 is a high-level block diagram illustrating selected aspects of another embodiment of a computing system implementing a memory interface 100 in accordance with the present description. In this embodiment, the computing system includes a plurality of data transfer logic elements, DTL1, DTL2, . . . DTLn, each of which may include a central processing unit, an offload data transfer engine, or other local or remote data transfer logic. Each data transfer logic such as the data transfer logic DTL1, for example, is configured to generate and transmit over an appropriate parallel or serial bus or other data path 102a, 102b, . . . 102n, to memory control logic 104 of the interface 100, a memory transaction request such as a read command or a write command, and an address such as a system memory address at which the memory transaction is to take place.

The memory interface 100 provides an interface between the plurality of data transfer logic elements, DTL1, DTL2, . . . DTLn, and a plurality of memories 110a, 110b. In this embodiment, the computer system employs a two-level memory system, often referred to as a "heterogeneous"

memory system employing a smaller, faster volatile memory 110a as a cache memory for a second, larger and slower memory 110b which may be a non-volatile memory.

For example, volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). Conversely, non-volatile memory is a storage medium that does not require power to maintain the state of data stored by the medium.

It is appreciated that selective memory mode authorization enforcement in accordance with the present description may be applied to a variety of host, storage and other memory devices such as for example, magnetic and optical disk drives, solid state drives and solid state memory devices that use chalcogenide phase change material (e.g., chalcogenide glass), three-dimensional (3D) crosspoint memory, or memory that incorporates memristor technology. Additional memory devices which may benefit from a memory interface having selective memory mode authorization enforcement in accordance with the present description may include other types of byte-addressable, write-in-place non-volatile memory, ferroelectric transistor random-access memory (FeTRAM), nanowire-based non-volatile memory, Magnetoresistive random-access memory (MRAM), Spin Transfer Torque (STT)-MRAM, Phase Change Memory (PCM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM)), STRAM (spin tunneling RAM), magnetic memory, magnetic random access memory (MRAM), and Semiconductor-oxide-nitride-oxidesemiconductor (SONOS, also known as dielectric memory). It is appreciated that other types of memory may benefit from a memory interface having selective memory mode authorization enforcement in accordance with the present description, depending upon the particular application.

The smaller cache memory 110a may be positioned closer to the central processing unit and thus may have a relatively short data path to the central processing unit to facilitate faster read and write operations between the central processing unit and the cache. Hence, the cache memory 110a is referred to herein as the "near" memory. Conversely, the larger, second memory 110b may be positioned more distant from the central processing unit. As a result, the larger, second memory 110b may have a longer data path to the central processing unit and is referred to herein as the "far" memory. It is appreciated that the sizes, data transfer speeds, volatility/non-volatility, data path lengths, numbers of memories and other architectural details of the memory system may vary, depending upon the particular application.

Because read and write operations may often be performed more quickly for data stored in the near memory, selected data initially stored in the far memory may be read from the far memory and temporarily cached in the near memory if it is anticipated that the data will be frequently accessed. If the data is modified in the near memory, it may be transferred back to the far memory for storage.

Accordingly, the memory control logic 104 is configured to transmit in response to a memory transaction request and a system address from a data transfer logic elements, DTL1, DTL2, . . . DTLn, a memory transaction request such as a read command or a write command to a memory 110a, 110b, together with the memory address of the appropriate memory 110a, 110b.

The memory control logic 104 is coupled to the near memory 110a by an appropriate parallel or serial bus or other data path 118a. Similarly, memory control logic 104 is coupled to the far memory 110b by an appropriate parallel or serial bus or other data path 118b. For example, the data path 118b may be a DDR bus in which memory transaction requests, memory addresses, error messages and other data are transmitted in accordance with a suitable transactional protocol. In one embodiment, the memory 110b and the associated data path 118b may comply with a standard promulgated by Joint Electron Device Engineering Council (JEDEC), which standard may be modified as appropriate in accordance with selective memory mode authorization enforcement in accordance with the present description. Such JEDEC standards include standards such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of the storage devices 106 that implement such standards may be referred to as DDR-based interfaces. Thus, in one embodiment, the memory 110b may include a DIMM and the interface between the DIMM of the memory 110b and the memory controller may be in accordance with the JEDEC DDR4 protocol and standard, modified as appropriate in accordance with selective memory mode authorization enforcement in accordance with the present description.

Accordingly, the memory control logic 104 may be configured to translate memory transaction requests and addresses from the protocols of the data transfer logic elements, DTL1, DTL2, . . . DTLn and their associated data paths 102a, 102b, . . . 102n, respectively, to suitable memory transaction requests and addresses for the near memory 110a, and far memory 110b and their associated data paths 118a, 118b, respectively, as appropriate. In some embodiments, a data path 118c may permit direct memory to memory transfers. It is appreciated that the hardware aspects and transmission protocols of the data paths 102a, 120b, . . . 102n, 118a, 118b, 118c may vary, depending upon the particular application.

In one embodiment, the memory control logic 104 may be implemented in one or more memory controllers. For example, the memory control logic 104 may include a memory controller for the near memory 110a and another memory controller for the far memory 110b. The memory controller or controllers of the memory control logic 104 may be implemented as separate devices or integrated with central processing units, offload data transfer engines, memory devices, etc.

In one aspect of the present description, the memory control logic 104 of the memory interface 100 includes memory mode selection data generation logic 114 which is configured to generate memory mode selection data, which identifies a particular memory mode in which a memory transaction request associated with memory mode selection data, is to be performed by a memory such as the far memory 110b. Thus, in connection with a memory transaction for transmission to the far memory 110b, the memory control logic may also transmit over the data path 118b, memory mode selection data which identifies a particular memory mode in which the memory transaction request associated with the memory mode selection data, is to be performed by the far memory 110*b*.

In this embodiment, the far memory 110*b* has a plurality of potential or candidate memory modes which the memory is capable of performing if the particular memory mode is enabled. Accordingly, the far memory 110*b* is referred to herein as a multi-mode memory. FIG. 4*a* is a table depicting examples of memory mode selection data which may be transmitted by the memory control logic 104 to the far memory 110*b* to identify a selected memory mode in which an associated memory transaction request is to be performed by the memory 110*b* if authorized. Thus, if the memory control logic 104 transmits a read command to the far memory 110*b*, the memory control logic 104 may also transmit memory mode selection data identifying a memory mode in which the read command is to be performed by the memory if that mode is authorized. For example, if the read command is to be performed in the volatile read/write memory mode, the data transfer logic may transmit the memory selection data 01 as indicated in the table of FIG. 4*a*, to indicate to the memory 110*b* that the associated read command is to be performed in the volatile read/write memory mode if that mode is authorized. Thus in one embodiment, a DIMM of the memory 110*b* may include both volatile and non-volatile memory such that a volatile read/write mode is the standard JEDEC write/read to JEDEC standard DDR volatile memory. In another embodiment in which a DIMM of the memory 110*b* includes only non-volatile memory, the volatile behavior may be suitably emulated.

In another example, the read command is to be performed in the volatile application direct mode. If so, the data transfer logic may transmit the memory selection data 11 as indicated in the table of FIG. 4*a*, to indicate to the memory 110*b* that the associated read command is to be performed in the volatile application direct mode if that mode is authorized. In the volatile read/write mode of this embodiment, memory transactions are cached in the near memory 110*a* as a write back, memory side cache for performance reasons. By comparison, in the application direct mode (either volatile or non-volatile) of this embodiment, memory transactions are not cached in the near memory 110*a*.

In the embodiment of FIG. 4*a*, at least two of the candidate memory modes has an associated memory mode selection data value which identifies the particular memory mode which has been selected. In addition, in this embodiment, each memory mode selection data value is represented by a two bit digital value such that additional candidate memory modes may have an associated memory mode selection data value which identifies the particular memory mode which has been selected. However, it is appreciated that in some embodiments, one or more memory modes may not have an associated memory mode selection data value as indicated by the entry n/a (not applicable) in FIG. 4*a*. In addition, for those memory modes having an associated memory mode selection data value, it is appreciated that the number of bits identifying the associated memory mode may vary, depending upon the particular application.

FIG. 4*b* is a table depicting another example of memory mode selection data which may be transmitted by the memory control logic 104 (FIG. 3) to a DIMM of the far memory 110*b* to identify a selected memory mode in which an associated memory transaction request is to be performed by the memory 110*b* if authorized. In this embodiment, every potential memory mode which the far memory 110*b* is capable of performing if authorized, is represented by a unique value of three bit memory mode selection data. Again, it is appreciated that the number of bits identifying an associated memory mode may vary, depending upon the particular application.

The multi-mode memory 110*b* of the computing system further includes a bit cell array 119 and a mode control logic 120 between the memory control logic 104 and the bit cell array 119 which may include a non-volatile memory. The mode control logic 120 is configured to control input/output operations for the bit cell array 119. For example, the mode control logic 120 is configured to store in or read from a memory region of the bit cell array 119, a plurality of units of data, such as blocks of sectors of data or other subunits of data. In the storage mode if authorized, the mode control logic 120 can store and retrieve data using block-based transactions, for example. In a memory mode, the mode control logic 120 can store and retrieve data using byte-based transactions, for example. It is appreciated that a system in accordance with the present description, may utilize other units and subunits of data and other computer architectures, depending upon the particular application.

In one embodiment, the mode control logic 120 is configured to receive from memory control logic 104, a memory transaction request and memory mode selection data associated with the memory transaction request, and is further configured to perform a memory transaction request in a selected memory mode of operation of a plurality of potential memory modes of operation, if the selected memory mode is has been authorized and is enabled. The mode control logic 120 in this embodiment, includes memory mode authorization logic 122 configured to compare memory mode selection data associated with a memory transaction request to a mode authorization classification structure 124 to determine if a memory mode associated with a memory transaction request is authorized. The mode control logic 120 further includes memory mode enablement logic 130 configured to enable the memory 110*b* to operate in a memory mode associated with a memory transaction request if it is determined that the memory mode associated with the memory transaction request is authorized.

Figure 5:
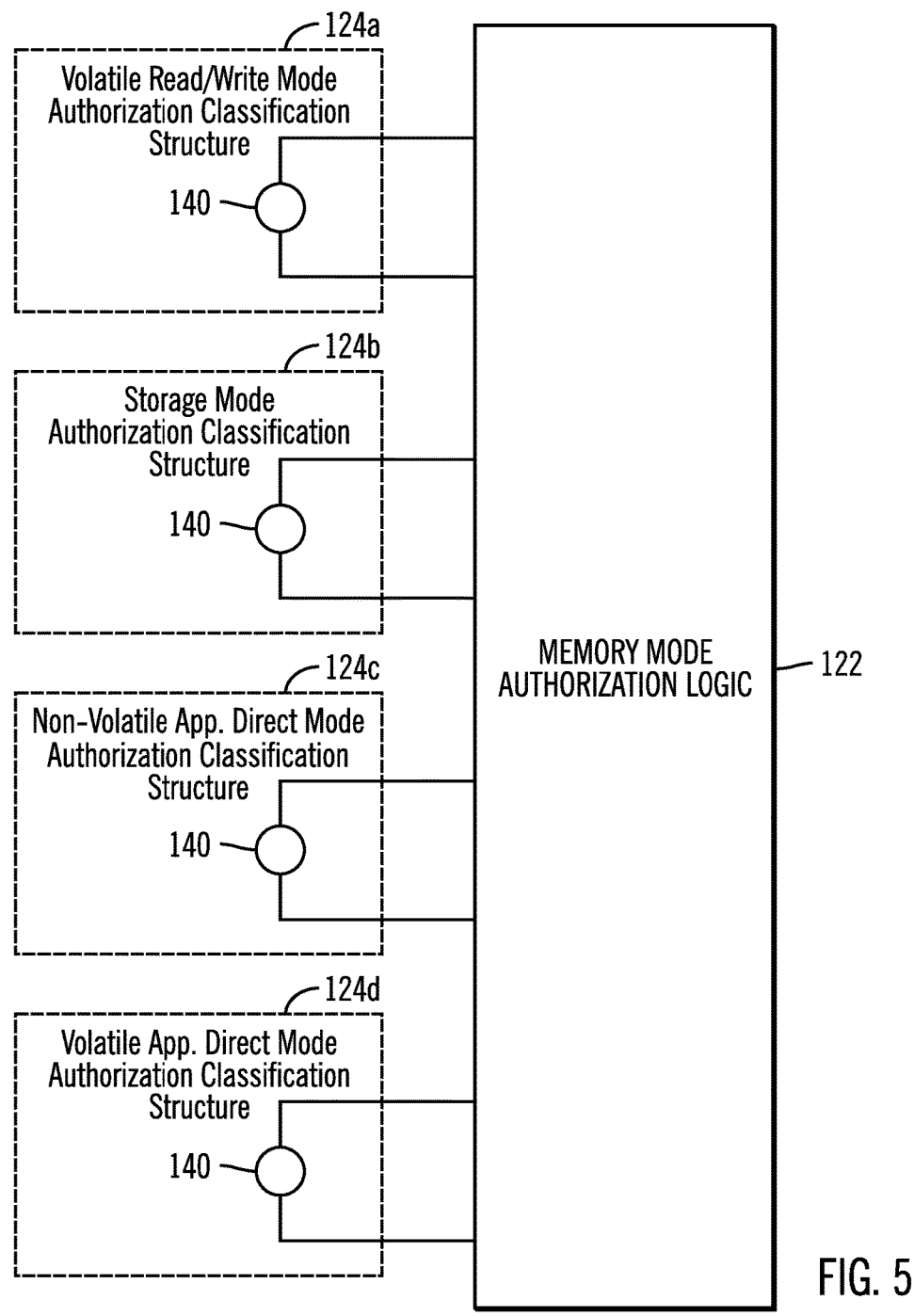
FIG. 5 depicts an embodiment of memory mode authorization classification structures associated with various memory modes of operation of a memory employing selective memory mode authorization enforcement in accordance with the present description.

FIG. 5 shows an example of a plurality of mode authorization classification structures 124*a*, 124*b*, 124*c*, 124*d*, each of which is associated with a particular memory mode of a plurality of potential memory modes of the memory 110*b* (FIG. 3). Each mode authorization classification structure 124*a*, 124*b*, 124*c*, 124*d* indicates whether an associated memory mode of operation is authorized.

Figure 6:
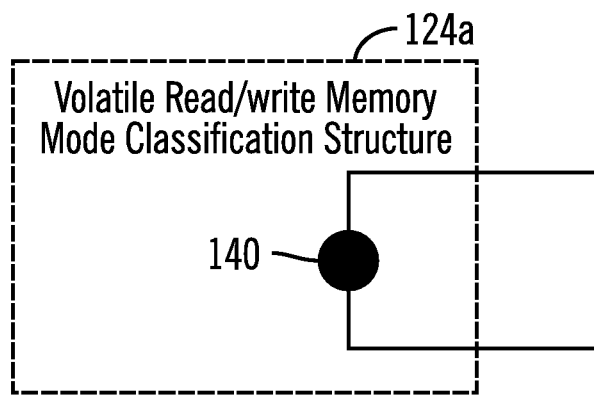
FIGS. 6, 7 depict various states of a memory mode authorization classification structure of FIG. 5.

In this embodiment, each mode authorization classification structure 124*a*, 124*b*, 124*c*, 124*d* includes a fuse 140 associated with a memory mode and configured to be set to indicate classification of a memory mode associated with the mode authorization classification structure as one of authorized and not authorized. The memory mode authorization logic 122 is configured to detect the state of each fuse 140 of the mode authorization classification structures 124*a*, 124*b*, 124*c*, 124*d* to determine if a memory mode associated with the fuse 140 is authorized. For example, the fuse 140 of the mode authorization classification structure 124*a* may be burned by a sufficiently high level of current to create an open circuit state as represented by the filled circle depiction of the fuse 140 in FIG. 6. In one embodiment, an open circuit state fuse may represent that the associated memory mode is an authorized memory mode.

Figure 7:
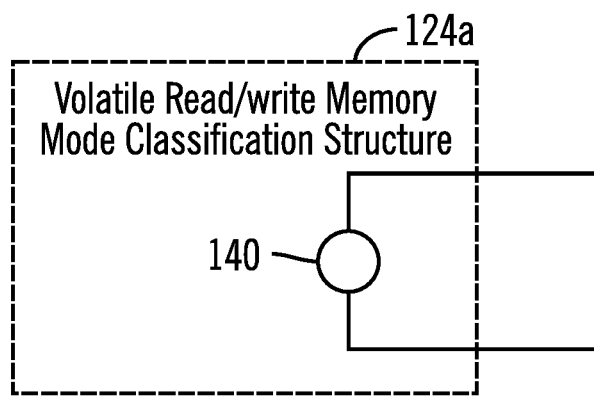

Conversely, burning of the fuse 140 of the mode authorization classification structure 124*a* may be omitted to preserve a closed circuit state as represented by the unfilled circle depiction of the fuse 140 in FIG. 7. In one embodiment, a closed circuit state fuse may represent that the associated memory mode is an unauthorized, that is, not authorized memory mode. It is appreciated that the assignment of open or closed circuit states of fuses to represent authorized or unauthorized memory modes, may vary depending upon the particular application. It is further appreciated that in some embodiments, a fuse may be burned to create a closed circuit state in the fuse. It is also appreciated that both static and dynamic fusing may be employed. It is still further appreciated that other structures, such as data structures, for example, may be used to store memory mode classification data to represent authorized or unauthorized classifications of memory modes. Such data structures may be implemented by bit cells, registers, read-only memories, and other data storage devices, for example, depending upon the particular application. Other embodiments may employ both fuses and data storage devices such that the open/closed state of the fuse is read by the memory mode authorization logic 122 and is stored as binary memory mode classification data in a data storage device to improve access speeds to the memory mode classification data, for example.

In one embodiment, the mode control logic 120 may be implemented in one or more memory controllers located on a die of a memory device or other components. In another embodiment, the mode control logic 120 may be integrated on a die of a central processing unit or a direct memory access (DMA) controller or engine, for example.

Figure 8:
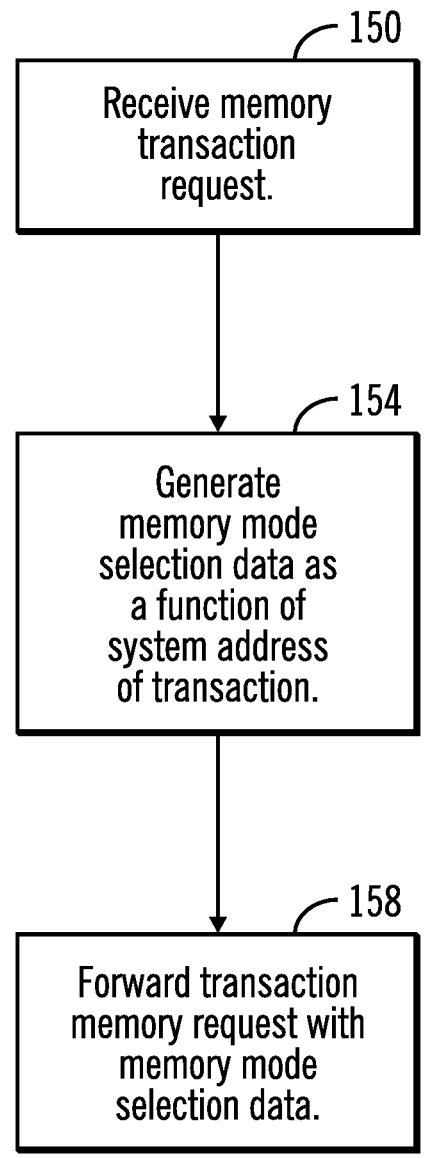
FIG. 8 depicts one embodiment of operations of a memory controller in a system employing selective memory mode authorization enforcement in accordance with the present description.
Figure 9A:
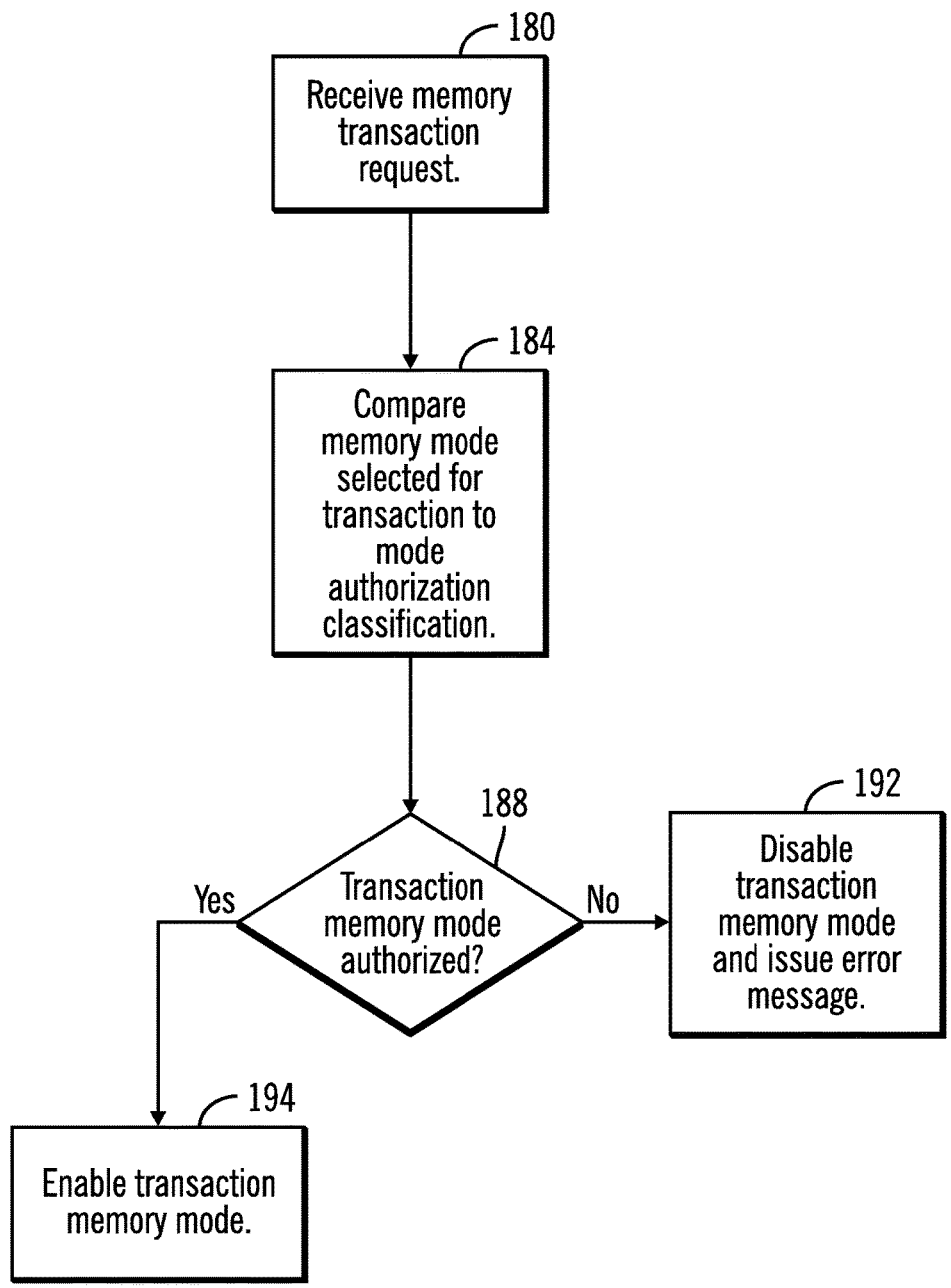
FIGS. 9a, 9b depict various embodiments of operations of a memory device in a system employing selective memory mode authorization enforcement in accordance with the present description.
Figure 9B:
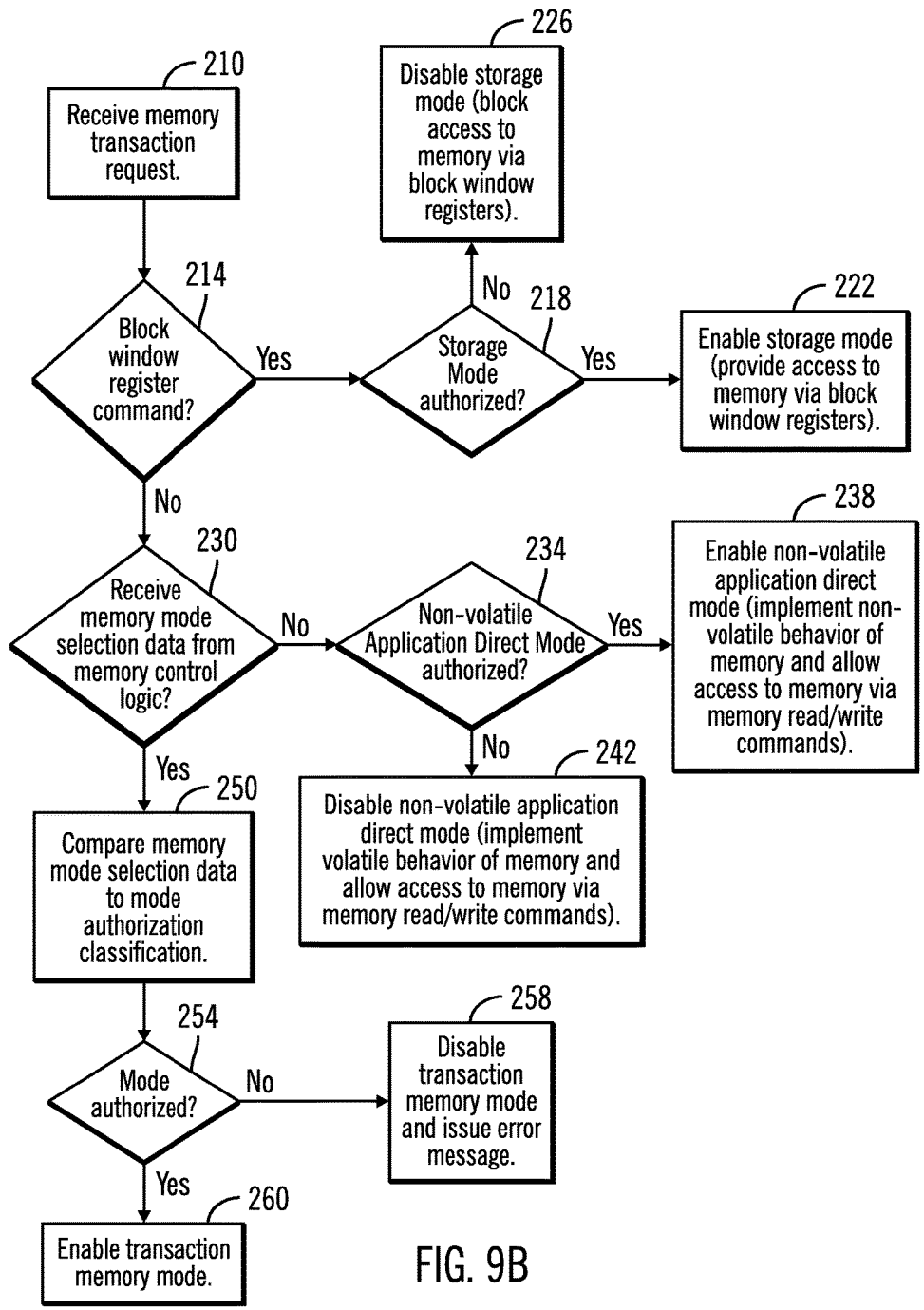

FIGS. 8, 9*a*, 9*b* depict examples of operations of a memory interface employing selective memory mode authorization enforcement in accordance with the present description. In particular, FIG. 8 depicts an example of operations of the memory mode selection data generation logic 114 (FIG. 3). In this example, the memory mode selection data generation logic 114 receives (block 150) a memory transaction request from a data transfer logic such as the data transfer logic DTL1 (FIG. 2). The memory mode selection data generation logic 114 generates (block 154) memory mode selection data as a function of the system address of the received memory transaction request. The memory mode selection data identifies a particular memory mode in which the memory transaction request associated with the memory mode selection data, is to be performed by a multi-mode memory such as the far memory 110*b*.

Thus, in the example of FIG. 4*a*, based upon the system address of the requested memory transaction, the memory mode selection data generation logic 114 may determine that the memory mode of the requested memory transaction is a read or write transaction to be performed in the volatile read/write memory mode of the multi-mode memory 110*b*, if authorized. Accordingly, the memory mode selection data generation logic 114 generates (block 154) a memory mode selection data value of 01 (FIG. 4*a*) which indicates that the selected memory mode for the requested memory transaction is the volatile read/write memory mode.

Conversely, based upon the system address of the requested memory transaction, the memory mode selection data generation logic 114 may determine that the memory mode of the requested memory transaction is a read or write transaction to be performed in the volatile application direct mode of the multi-mode memory 110*b*, if authorized. Accordingly, the memory mode selection data generation logic 114 generates (block 154) a memory mode selection data value of 11 (FIG. 4*a*) which indicates that the selected memory mode for the requested memory transaction is the volatile application direct mode.

As previously mentioned in one embodiment, a DIMM of the memory 110*b* may include both volatile and non-volatile memory such that a volatile read/write mode is the standard JEDEC write/read to JEDEC standard DDR volatile memory. In another embodiment in which a DIMM of the memory 110*b* includes only non-volatile memory, the volatile behavior may be suitably emulated.

In yet another example, based upon the system address of the requested memory transaction, the memory mode selection data generation logic 114 may determine that the memory mode of the requested memory transaction is an authorized memory mode for the multi-mode memory 110*b*. Accordingly, the memory mode selection data generation logic 114 generates (block 154) a memory mode selection data value of 00 (FIG. 4*a*) which indicates that all memory modes for the requested memory transaction are authorized.

In still another example, based upon the system address of the requested memory transaction, the memory mode selection data generation logic 114 may determine that the memory mode of the requested memory transaction is a block window register transaction to be performed in the storage mode of the multi-mode memory 110*b*, if authorized. As previously mentioned, a storage mode in one embodiment is one in which data may be read from the memory in response to a memory block window register read transaction request. Similarly, data may be written to the memory in response to a memory block window register write transaction request.

In the example of FIG. 4*a*, the memory mode selection data generation logic 114 may bypass generating a memory mode selection data value as indicated by the not applicable (n/a) values of the memory mode selection data for a storage mode transaction. It is appreciated that in some embodiments, a memory such as the multi-mode memory 110*b* may accurately identify storage mode memory transactions in which the transaction address includes an address for a block window register of the storage mode. As a result, memory mode selection data may be obviated for storage mode transactions in some embodiments.

By comparison, in the embodiment of FIG. 4*b*, the storage mode is assigned an associated memory mode selection data value such as 100 for example as depicted in the table of FIG. 4*b*. Hence, based upon the system address of the requested memory transaction, the memory mode selection data generation logic 114 may determine that the requested memory transaction is to be performed in the storage mode of the multi-mode memory 110*b*, if authorized. Accordingly, the memory mode selection data generation logic 114 generates (block 154) a memory mode selection data value of 100 (FIG. 4*b*) which indicates that the selected memory mode for the requested memory transaction is the storage mode.

Similarly, in the embodiment of FIG. 4*b*, the non-volatile application direct mode is assigned an associated memory mode selection data value such as 010 for example as depicted in the table of FIG. 4*b*. Hence, based upon the system address of the requested memory transaction, the memory mode selection data generation logic 114 may determine that the requested memory transaction is to be performed in the non-volatile application direct mode of the multi-mode memory 110*b*, if authorized. Accordingly, the memory mode selection data generation logic 114 generates (block 154) a memory mode selection data value of 010 (FIG. 4*b*) which indicates that the selected memory mode for the requested memory transaction is the non-volatile application direct mode.

Conversely, in the example of FIG. 4a, the memory mode selection data generation logic 114 may bypass generating a memory mode selection data value as indicated by the not applicable (n/a) values of the memory mode selection data for a non-volatile application direct mode transaction. It is appreciated that in some embodiments, a memory such as the multi-mode memory 110b may accurately identify non-volatile application direct mode memory transactions. As a result, memory mode selection data may be obviated for non-volatile application direct mode transactions in some embodiments.

Upon generating (block 154, FIG. 8) appropriate memory mode selection data (if applicable) for the received memory transaction request, the memory mode selection data generation logic 114 (FIG. 3) forwards (block 158, FIG. 8) the memory transaction request to the appropriate memory, together with the generated memory mode selection data if applicable for the memory transaction request being forwarded. As previously mentioned, the memory mode selection data generation logic 114 (FIG. 3) may translate the format of the memory transaction request received from a data transfer logic to a format suitable for the particular memory, such as a memory transaction request formatted in accordance with a transactional protocol, for example. In a similar manner, the memory mode selection data forwarded to the memory may be formatted to a format suitable for the particular destination memory.

FIG. 9a depicts an example of operations of the mode control logic 120 (FIG. 3) of a memory interface employing memory interface having selective memory mode authorization enforcement in accordance with the present description, in connection with the embodiment of FIG. 4b. In this example, the mode control logic 120 receives (block 180) a memory transaction request forwarded by the memory control logic 104. The memory transaction request originates with a data transfer logic such as the data transfer logic DTL1 (FIG. 3). The memory mode authorization logic of the mode control logic 120 compares (block 184) the memory mode selection data accompanying the received memory transaction request to a mode authorization classification as indicated by a mode authorization classification structure 124a, 124b . . . 124d for the received memory transaction request, to determine (block 188) if the memory mode identified by the received memory mode selection data is authorized to be performed by the multi-mode destination memory such as the far memory 110b.

In the illustrated embodiment, the mode authorization classification structure associated with the memory mode identified by the received memory mode selection data, may be identified by the value of the memory mode selection data accompanying the received memory transaction request to determine if the memory mode identified by the received memory mode selection data is authorized. Thus, in the example of FIGS. 4b and 5, the volatile read/write mode authorization classification structure 124a (FIG. 5) for example, may be identified by memory mode selection data accompanying the received memory transaction request having a value of 001 in the embodiment of FIG. 4b. The other mode authorization classification structures 124b, 124c or 124d associated with the memory mode identified by the received memory mode selection data, may be identified by a value 100, 010, or 011, respectively, of the memory mode selection data accompanying the received memory transaction request. Although the embodiments of FIG. 5 depict four mode authorization classification structures for four associated memory modes, it is appreciated that the number of mode authorization classification structures and associated memory modes may vary, depending upon the particular application.

Having identified the mode authorization classification structure associated with the memory mode identified by the received memory mode selection data, the identified mode authorization classification structure may be read to determine if the associated mode is authorized to be performed by the multi-mode memory. Thus, in the example of FIGS. 4b and 5, if the storage mode classification structure 124b (FIG. 5) for example, is identified by a memory mode selection data value of 100 (FIG. 4b) accompanying the received memory transaction, the storage mode classification structure 124b (FIG. 5) may be read to determine if the fuse 140 of the storage mode classification structure 124b has an open circuit state or a closed circuit state, and accordingly determine if the storage mode associated with the storage mode classification structure 124b is authorized or not authorized.

In a similar manner, if the non-volatile application direct mode classification structure 124c (FIG. 5) for example, is identified by a memory mode selection data value of 010 (FIG. 4b) accompanying the received memory transaction, the non-volatile application direct mode authorization classification structure 124c (FIG. 5) may be read to determine if the fuse 140 of the non-volatile application direct mode authorization classification structure 124c has an open circuit state or a closed circuit state, and accordingly determine if the non-volatile application direct mode associated with the non-volatile application direct mode authorization classification structure 124c is authorized or not authorized.

As another example, if the volatile application direct mode classification structure 124d (FIG. 5) is identified by a memory mode selection data value of 011 (FIG. 4b) accompanying the received memory transaction, the volatile application direct mode authorization classification structure 124d (FIG. 5) may be read to determine if the fuse 140 of the volatile application direct mode authorization classification structure 124d has an open circuit state or a closed circuit state, and accordingly determine if the volatile application direct mode associated with the volatile application direct mode authorization classification structure 124d is authorized or not authorized.

If it is determined (block 188, FIG. 9a) that the memory mode identified by the received memory mode selection data is not authorized to be performed by the multi-mode destination memory such as the far memory 110b, the memory mode enablement logic 130 (FIG. 3) disables (block 192) performance of the requested memory transaction in the selected memory mode as identified by the memory mode selection data accompanying the memory transaction request. In one embodiment, the memory mode enablement logic 130 may block execution of the requested memory transaction in its entirety. For example, a requested memory operation may be accompanied by memory mode selection data requesting execution of the memory transaction in an unauthorized storage mode, for example. Thus, in one embodiment, the memory mode enablement logic 130 may block execution of the requested memory transaction in its entirety by blocking access to the block window registers.

In another embodiment, the memory mode enablement logic 130 may permit the requested memory transaction to proceed, but the requested memory transaction will be executed in an authorized memory mode rather than the memory mode selected by the accompanying memory mode selection data. For example, a requested write operation may be accompanied by memory mode selection data requesting execution of the memory transaction in an unauthorized non-volatile mode. Accordingly, in one embodiment, the memory mode enablement logic 130 may only permit the requested memory transaction to proceed in an authorized volatile mode instead of in an unauthorized non-volatile mode, for example. Thus, in the event of a system reset or power cycle applied to the memory, for example, the mode control logic 120 may prevent access to the data notwithstanding that the memory is a non-volatile memory since the data would have been lost in the mode which was authorized, that is, a volatile mode, in this example.

One technique for emulating a volatile memory in the operation of a non-volatile memory is to encrypt the data and in the event of a system reset or application of a power cycle to the memory, to discard the encryption key. In this manner, the encrypted data may not be readily decrypted, effectively preventing ready access to the data notwithstanding that the encrypted data remains stored in a non-volatile memory after a system reset or an application of a power cycle. It is appreciated that other techniques may be used to emulate a volatile memory, depending upon the particular application.

If it is determined (block 188, FIG. 9*a*) that the memory mode identified by the received memory mode selection data is authorized to be performed by the multi-mode destination memory such as the far memory 110*b*, the memory mode enablement logic 130 (FIG. 3) enables (block 194) performance of the requested memory transaction in the selected memory mode as identified by the memory mode selection data accompanying the memory transaction request. For example, when the volatile read/write memory mode is enabled, the memory mode control logic 120 is configured to read data from the memory in response to a memory read transaction request and to write data to the memory in response to a memory write transaction request. Also, if the memory is a non-volatile memory, the memory mode control logic 120 is further configured to emulate volatile behavior of the memory to restrict access to data written to the memory upon application of a system reset or a power cycle to the memory as described above, when the volatile read/write memory mode is enabled.

If it is determined (block 188, FIG. 9*a*) that the memory mode identified by the received memory mode selection data is the volatile application direct mode, and it is determined that the volatile application direct mode is authorized to be performed by the multi-mode destination memory such as the far memory 110*b*, the memory mode enablement logic 130 (FIG. 3) enables (block 194) performance of the requested memory transaction in the selected volatile application direct mode as identified by the memory mode selection data accompanying the memory transaction request. For example, when the volatile application direct mode is enabled, the memory mode control logic 120 is configured to operate in a manner similar to that of the volatile, read/write memory mode discussed above. Thus, the memory mode control logic 120 is configured to read data from the memory in response to a memory read transaction request and to write data to the memory in response to a memory write transaction request. Also, if the memory is a non-volatile memory, the memory mode control logic 120 is further configured to emulate volatile behavior of the memory to restrict access to data written to the memory upon application of a system reset or a power cycle to the memory as described above, when the volatile read/write memory mode is enabled.

In one embodiment, a difference between the volatile, read/write memory mode and the volatile application direct mode is that in the volatile, read/write memory mode, the near memory 110 is utilized as a write back, memory side cache to improve read/write performance. In the volatile application direct mode, data is not cached in a near memory such as the volatile near memory 110*a*. Similarly, in the non-volatile application direct mode, and the storage mode, data is not cached in a near memory such as the volatile near memory 110*a*.

If it is determined (block 188, FIG. 9*a*) that the memory mode identified by the received memory mode selection data is the non-volatile application direct mode, and it is determined that the non-volatile application direct mode is authorized to be performed by the multi-mode destination memory such as the far memory 110*b*, the memory mode enablement logic 130 (FIG. 3) enables (block 194) performance of the requested memory transaction in the selected non-volatile application direct mode as identified by the memory mode selection data accompanying the memory transaction request. For example, when the non-volatile application direct mode is enabled, the memory mode control logic 120 is configured to operate in a manner similar to that of the volatile, read/write memory mode discussed above, except in the non-volatile mode instead of the volatile mode. Thus, the memory mode control logic 120 is configured to read data from the memory in response to a memory read transaction request and to write data to the memory in response to a memory write transaction request. Also, if the memory is a non-volatile memory, the memory mode control logic 120 is further configured to implement non-volatile behavior of the memory to permit access to data written to the memory notwithstanding that a system reset or a power cycle has been applied to the memory as described above, when the non-volatile read/write memory mode is enabled.

As indicated in FIG. 4*b*, in a mode of operation identified by the memory mode selection data value 000 in this embodiment, all modes of operation of which the multi-mode memory is capable of performing, are authorized. Hence, if the mode control logic 120 receives the memory mode selection data value 000, the memory mode authorization logic of the mode control logic 120 is configured to determine (block 188) that all modes are authorized independently of the settings of the mode authorization structures 124*a*. 124*b* . . . 124*d*. Accordingly, the memory mode enable logic 130 enables (block 194) all modes of operation of the multi-mode memory for the received memory transaction request having an associated memory mode selection data value 000 accompanying the memory transaction request.

FIG. 9*b* depicts another example of operations of the mode control logic 120 (FIG. 3) of a memory interface employing selective memory mode authorization enforcement in accordance with the present description, in connection with the embodiment of FIG. 4*a* in which not all memory modes of the memory have an associated memory mode selection data value. In this example, the mode control logic 120 receives (block 210, FIG. 9*b*) a memory transaction request forwarded by the memory control logic 104. As previously mentioned, the memory transaction request originates with a data transfer logic such as the data transfer logic DTL1 (FIG. 3). The memory mode authorization logic 122 of the mode control logic 120 is configured to determine (block 214) whether the memory transaction request is directed to a block window register indicating that the memory transaction request is directed to the storage mode. If so, the memory mode authorization logic of the mode control logic 120 determines (block 218) whether a storage mode is authorized by reading the mode authorization classification structure 124*b* (FIG. 5) which indicates the storage mode classification as authorized or unauthorized, depending upon the state of the fuse 140 of the storage mode authorization classification structure 124*b*.

If it is determined (block 218, FIG. 9*b*) that the storage mode is authorized to be performed by the multi-mode destination memory such as the far memory 110*b*, the memory mode enablement logic 130 (FIG. 3) enables (block 222, FIG. 9*b*) performance of the requested memory transaction in the storage mode. In one embodiment, the memory mode enablement logic 130 may enable execution of the requested memory transaction in the storage mode by permitting access to the block window registers utilized in the storage mode when authorized.

Conversely, if it is determined (block 218, FIG. 9*b*) that the storage mode is not authorized to be performed by the multi-mode destination memory such as the far memory 110*b*, the memory mode enablement logic 130 (FIG. 3) disables (block 226) performance of the requested memory transaction in the storage mode. In one embodiment, the memory mode enablement logic 130 may disallow execution of the requested memory transaction in its entirety. For example, an unauthorized storage mode may be disabled by, for example, blocking access to the block window registers.

If it is determined (block 214, FIG. 9*b*) by the memory mode authorization logic 122 of the mode control logic 120 that the memory transaction request is not directed to a block window register indicating that the memory transaction request is not directed to the storage mode, the memory mode authorization logic 122 is further configured to determine (block 230, FIG. 9*b*) whether the memory transaction request was accompanied or otherwise associated with memory mode selection data received from the memory control logic 104 (FIG. 3). As indicated in the embodiment of FIG. 4*a*, the non-volatile application direct mode is not associated with memory mode selection data.

Accordingly, if it is determined (block 230, FIG. 9*b*) that the memory transaction request was not accompanied or otherwise associated with memory mode selection data received from the memory control logic 104, indicating that the selected memory mode is the non-volatile application direct mode, the memory mode authorization logic 122 is further configured to determine (block 234, FIG. 9*b*) whether the non-volatile application direct mode is authorized by reading the mode authorization classification structure 124*c* (FIG. 5) which indicates the non-volatile application direct mode classification as authorized or unauthorized, depending upon the state of the fuse 140 of the non-volatile application direct mode authorization classification structure 124*c*.

If it is determined (block 234, FIG. 9*b*) that the non-volatile application direct mode is authorized to be performed by the multi-mode destination memory such as the far memory 110*b*, the memory mode enablement logic 130 (FIG. 3) enables (block 238, FIG. 9*b*) performance of the requested memory transaction in the non-volatile application direct mode. In one embodiment, the memory mode enablement logic 130 may enable execution of the requested memory transaction in the non-volatile application direct mode by implementing non-volatile behavior of memory and allowing access to memory via memory read/write commands.

Conversely, if it is determined (block 234, FIG. 9*b*) that the non-volatile application direct mode is not authorized to be performed by the multi-mode destination memory such as the far memory 110*b*, the memory mode enablement logic 130 (FIG. 3) disables (block 242) performance of the requested memory transaction in the non-volatile application direct mode. In one embodiment, the memory mode enablement logic 130 may block execution of the requested memory transaction in its entirety. In another embodiment, the memory mode enablement logic 130 may enable execution of the requested memory transaction in the volatile application direct mode instead of in the non-volatile application mode by emulating volatile behavior of memory and allowing access to memory via memory read/write commands.

If it is determined (block 230, FIG. 9*b*) that the memory transaction request was accompanied or otherwise associated with memory mode selection data received from the memory control logic 104 (FIG. 3), the memory mode authorization logic of the mode control logic 120 compares (block 250) the memory mode selection data accompanying the received memory transaction request to a mode authorization classification in a manner similar to that described above in connection with FIG. 9*a*. Thus, the memory mode authorization classification is indicated by a mode authorization classification structure for the received memory transaction request. The memory mode authorization logic determines (block 254) if the memory mode identified by the received memory mode selection data is authorized to be performed by the multi-mode destination memory such as the far memory 110*b*.

In the example of FIGS. 4*a* and 5, the volatile read/write memory mode authorization classification structure 124*a* (FIG. 5) for example, may be identified by memory mode selection data accompanying the received memory transaction request having a value of 01 in the embodiment of FIG. 4*a*. The other mode authorization classification structure 124*d* associated with the volatile application direct mode identified by the received memory mode selection data, may be identified by a value 11 of the memory mode selection data accompanying the received memory transaction request.

Having identified the mode authorization classification structure associated with the memory mode identified by the received memory mode selection data, the identified mode authorization classification structure may be read to determine if the associated mode is authorized to be performed by the multi-mode memory. Thus, in the example of FIGS. 4*a* and 5, if the storage mode classification structure 124*a* (FIG. 5) for example, is identified by a memory mode selection data value of 01 (FIG. 4*a*) accompanying the received memory transaction, the volatile read/write memory mode classification structure 124*a* (FIG. 5) may be read to determine if the fuse 140 of the storage mode classification structure 124*a* has an open circuit state or a closed circuit state, and accordingly determine if the volatile read/write memory mode associated with the volatile read/write memory mode classification structure 124*a* is authorized or not authorized.

In a similar manner, if the volatile application direct mode classification structure 124*d* (FIG. 5) for example, is identified by a memory mode selection data value of 11 (FIG. 4*a*) accompanying the received memory transaction, the volatile application direct mode authorization classification structure 124*d* (FIG. 5) may be read to determine if the fuse 140 of the volatile application direct mode authorization classification structure 124*d* has an open circuit state or a closed circuit state, and accordingly determine if the volatile application direct mode associated with the volatile application direct mode authorization classification structure 124*d* is authorized or not authorized.

If it is determined (block 254, FIG. 9*b*) that the memory mode identified by the received memory mode selection data is not authorized to be performed by the multi-mode destination memory such as the far memory 110b, the memory mode enablement logic 130 (FIG. 3) disables (block 258) performance of the requested memory transaction in the selected memory mode as identified by the memory mode selection data accompanying the memory transaction request. In one embodiment, the memory mode enablement logic 130 may block execution of the requested memory transaction in its entirety. In another embodiment, the memory mode enablement logic 130 may permit the requested memory transaction to proceed, but the requested memory transaction will be executed in an authorized memory mode rather than the memory mode selected by the accompanying memory mode selection data.

If it is determined (block 254, FIG. 9b) that the memory mode identified by the received memory mode selection data is authorized to be performed by the multi-mode destination memory such as the far memory 110b, the memory mode enablement logic 130 (FIG. 3) enables (block 260) performance of the requested memory transaction in the selected memory mode as identified by the memory mode selection data accompanying the memory transaction request. For example, when the volatile read/write memory mode is enabled, the memory mode control logic 120 is configured to read data from the memory in response to a memory read transaction request and to write data to the memory in response to a memory write transaction request. Also, if the memory is a non-volatile memory, the memory mode control logic 120 is further configured to emulate volatile behavior of the memory to restrict access to data written to the memory upon application of a system reset or a power cycle to the memory as described above, when the volatile read/write memory mode is enabled.

If it is determined (block 250, FIG. 9b) that the memory mode identified by the received memory mode selection data is the volatile application direct mode, and it is determined that the volatile application direct mode is authorized to be performed by the multi-mode destination memory such as the far memory 110b, the memory mode enablement logic 130 (FIG. 3) enables (block 260) performance of the requested memory transaction in the selected volatile application direct mode as identified by the memory mode selection data accompanying the memory transaction request.

It is appreciated that the operations depicted in the figures may be performed by memory interface logic having selective memory mode authorization enforcement utilizing architectures other than that depicted in the figures and employing other types of logic components. The logic components discussed herein including the logic elements depicted in figures may be configured to perform the described operations using appropriate hardware, software or firmware, or various combinations thereof. The software may be in the form of firmware, programs, drivers and other instruction sets, and the hardware may be in the form of general purpose logic devices such as microprocessors or specific purpose logic devices such as a memory controller, DMA controller or engine or ASIC device, for example.

The hardware, software or firmware for devices employing selective memory mode authorization enforcement in accordance with the present description, may be physically or logically located in any component of the system including the memory itself, a controller such as a memory controller, DMA controller, a microprocessor, etc. Thus, in one embodiment, one or more of the memory interface logic elements depicted in the figures, may be implemented with one or more of hardware of a memory controller, firmware for a memory controller, and software such as associated driver software of a memory controller. In another embodiment, one or more of the memory interface logic elements depicted in the figures may be implemented with one or more of controller hardware such as the central processing unit, for example, or other controller, firmware for the controller hardware and software for the controller hardware such as programs and drivers executed by the controller hardware such as a central processing unit for example. In another embodiment, one or more of the memory interface logic elements depicted in the figures may be implemented with hardware, firmware or software for both an offload data transfer engine and a central processing unit, for example.

It is appreciated that a devices employing selective memory mode authorization enforcement in accordance with the present description can, depending upon the particular application, reduce or eliminate operation of devices in unauthorized modes of operation. Other aspects may be achieved, depending upon the particular application.

EXAMPLES

The following examples pertain to further embodiments.

Example 1 is an apparatus, comprising: memory interface logic having a memory and mode control logic configured to receive a memory transaction request and memory mode selection data associated with the memory transaction request and to perform a memory transaction request in a selected memory mode of operation of a plurality of potential memory modes of operation, if the selected memory mode of operation is enabled, said mode control logic including: a mode authorization classification structure for a memory mode of operation of the plurality of potential memory modes of operation of the mode control logic, wherein a mode authorization classification structure is configured to indicate whether an associated memory mode of operation is authorized, memory mode authorization logic configured to compare memory mode selection data associated with a memory transaction request to a mode authorization classification structure to determine if a selected memory mode associated with a memory transaction request is authorized, and memory mode enablement logic configured to enable the mode control logic to operate in a selected memory mode associated with a memory transaction request if it is determined that the selected memory mode associated with the memory transaction request is authorized.

In Example 2, the subject matter of Examples 1-8 (excluding the present Example) can optionally include wherein the mode authorization classification structure of the mode control logic further includes a fuse associated with a memory mode and configured to be set to indicate classification of a memory mode associated with the mode authorization classification structure as one of authorized and not authorized.

In Example 3, the subject matter of Examples 1-8 (excluding the present Example) can optionally include wherein the plurality of potential memory modes of operation of the mode control logic includes a volatile read/write memory mode in which the mode control logic is configured to read data from the memory in response to a memory read transaction request and to write data to the memory in response to a memory write transaction request, when enabled, wherein the memory is a nonvolatile memory and wherein the mode control logic is further configured to when the volatile read/write memory mode is enabled, to emulate volatile behavior of the memory to restrict access to data written to the memory upon application of a power cycle to the memory.

In Example 4, the subject matter of Examples 1-8 (excluding the present Example) can optionally include wherein the plurality of potential memory modes of operation of the mode control logic includes a volatile application direct mode in which the mode control logic is configured to read data from the memory in response to a memory read transaction request, and to write data to the memory in response to a memory write transaction request, wherein the memory is a nonvolatile memory and wherein the mode control logic is configured to when the volatile application direct mode is enabled, to restrict access to data written to the memory upon application of a power cycle to the memory to emulate volatile behavior of the memory.

In Example 5, the subject matter of Examples 1-8 (excluding the present Example) can optionally include wherein the plurality of potential memory modes of operation of the memory includes a storage mode in which the mode control logic is configured to read data from the memory in response to a memory block window register read transaction request, and to write data to the memory in response to a memory block window register write transaction request, and wherein the memory mode enablement logic is further configured to prevent access to the memory via block window registers to disable a storage mode associated with a memory block window register transaction request if it is determined that a storage mode associated with a memory block window register transaction request is not authorized.

In Example 6, the subject matter of Examples 1-8 (excluding the present Example) can optionally include wherein the plurality of potential memory modes of operation of the memory includes a non-volatile application direct mode in which the mode control logic is configured to read data from the memory in response to a memory read transaction request, and to write data to the memory in response to a memory write transaction request, wherein the memory is a nonvolatile memory and wherein mode control logic is further configured to when the non-volatile application direct mode is enabled, to permit access to data written to the memory notwithstanding application of a power cycle to the memory to implement non-volatile behavior of the memory.

In Example 7, the subject matter of Examples 1-8 (excluding the present Example) can optionally be for use with a data transfer logic configured to transmit to the memory interface logic, a memory transaction request and a system address for the memory transaction request, wherein the memory interface logic further includes memory control logic configured to transmit to the mode control logic, in response to a memory transaction request and a system address from the data transfer logic, a memory transaction request together with a memory address, and wherein the memory control logic includes memory mode selection data generation logic configured to generate and transmit to the mode control logic, memory mode selection data which identifies a particular memory mode in which a memory transaction request associated with memory mode selection data, is to be performed by the mode control logic.

In Example 8, the subject matter of Examples 1-8 (excluding the present Example) can optionally include a system, said system comprising said memory interface logic and a data transfer logic configured to transmit to the memory interface logic, a memory transaction request and a system address for the memory transaction request, said system comprising at least one of:
a display communicatively coupled to the data transfer logic, a network interface communicatively coupled to the data transfer logic, and a battery coupled to provide power to the system.

Example 9 is a method, comprising: receiving by a memory, memory mode selection data indicating a memory mode in association with a memory transaction request, and comparing received memory mode selection data to a mode authorization classification structure to determine if a memory mode associated with a memory transaction request is authorized, wherein a mode authorization classification structure for a memory mode of a plurality of potential memory modes of operation of the memory, indicates whether an associated memory mode of operation is authorized.

In Example 10, the subject matter of Examples 9-16 (excluding the present Example) can optionally include enabling a memory mode associated with a memory transaction request if it is determined that the memory mode associated with the memory transaction request is authorized.

In Example 11, the subject matter of Examples 9-16 (excluding the present Example) can optionally include setting a fuse of the mode authorization classification structure to indicate classification of a memory mode for the mode authorization classification structure as one of authorized and not authorized.

In Example 12, the subject matter of Examples 9-16 (excluding the present Example) can optionally include wherein the plurality of potential memory modes of operation of the memory includes a volatile read/write memory mode in which data may be read from the memory in response to a memory read transaction request and in which data may be written to the memory in response to a memory write transaction request, wherein the memory is a nonvolatile memory and wherein the volatile read/write memory mode includes when enabled, emulating volatile behavior of the memory to restrict access to data written to the memory upon application of at least one of a system reset and a power cycle to the memory.

In Example 13, the subject matter of Examples 9-16 (excluding the present Example) can optionally include wherein the plurality of potential memory modes of operation of the memory includes a volatile application direct mode in which data may be read from the memory in response to a memory read transaction request, and in which data may be written to the memory in response to a memory write transaction request, wherein the memory is a nonvolatile memory and wherein the volatile application direct mode includes when enabled, emulating volatile behavior of the memory to restrict access to data written to the memory upon application of a power cycle to the memory.

In Example 14, the subject matter of Examples 9-16 (excluding the present Example) can optionally include wherein the plurality of potential memory modes of operation of the memory includes a storage mode in which data may be read from the memory in response to a memory block window register read transaction request, and in which data may be written to the memory in response to a memory block window register write transaction request, wherein the method further includes disabling a storage mode associated with a memory block window register transaction request if it is determined that a storage mode associated with a memory block window register transaction request is not authorized, and wherein the disabling a storage mode includes preventing access to the memory via block window registers.

In Example 15, the subject matter of Examples 9-16 (excluding the present Example) can optionally include wherein the plurality of potential memory modes of operation of the memory includes a non-volatile application direct mode in which data may be read from the memory in response to a memory read transaction request, and in which data may be written to the memory in response to a memory write transaction request, wherein the memory is a nonvolatile memory and wherein the non-volatile application direct mode includes when enabled, implementing non-volatile behavior of the memory to permit access to data written to the memory notwithstanding application of at least one of system reset and a power cycle to the memory.

In Example 16, the subject matter of Examples 9-16 (excluding the present Example) can optionally include a data transfer logic transmitting to a memory interface logic, a memory transaction request and a system address for the memory transaction request, transmitting to the memory, in response to a memory transaction request and a system address from the data transfer logic, a memory transaction request together with a memory address, and generating and transmitting to the memory, memory mode selection data which identifies a particular memory mode in which a memory transaction request associated with memory mode selection data, is to be performed by the memory.

Example 17 is an apparatus comprising means to perform a method as claimed in any preceding claim.

Example 18 is a system, comprising: a central processing unit, and memory interface logic having a memory and mode control logic configured to receive a memory transaction request and memory mode selection data associated with the memory transaction request and to perform a memory transaction request in a selected memory mode of operation of a plurality of potential memory modes of operation, if the selected memory mode of operation is enabled, said mode control logic including: a mode authorization classification structure for a memory mode of operation of the plurality of potential memory modes of operation of the mode control logic, wherein a mode authorization classification structure is configured to indicate whether an associated memory mode of operation is authorized, memory mode authorization logic configured to compare memory mode selection data associated with a memory transaction request to a mode authorization classification structure to determine if a selected memory mode associated with a memory transaction request is authorized, and memory mode enablement logic configured to enable the mode control logic to operate in a selected memory mode associated with a memory transaction request if it is determined that the selected memory mode associated with the memory transaction request is authorized.

In Example 19, the subject matter of Examples 18-25 (excluding the present Example) can optionally include wherein the mode authorization classification structure of the mode control logic further includes a fuse associated with a memory mode and configured to be set to indicate classification of a memory mode associated with the mode authorization classification structure as one of authorized and not authorized.

In Example 20, the subject matter of Examples 18-25 (excluding the present Example) can optionally include the plurality of potential memory modes of operation of the mode control logic includes a volatile read/write memory mode in which the mode control logic is configured to read data from the memory in response to a memory read transaction request and to write data to the memory in response to a memory write transaction request, when enabled, wherein the memory is a nonvolatile memory and wherein the mode control logic is further configured to when the volatile read/write memory mode is enabled, to emulate volatile behavior of the memory to restrict access to data written to the memory upon application of a power cycle to the memory.

In Example 21, the subject matter of Examples 18-25 (excluding the present Example) can optionally include wherein the plurality of potential memory modes of operation of the mode control logic includes a volatile application direct mode in which the mode control logic is configured to read data from the memory in response to a memory read transaction request, and to write data to the memory in response to a memory write transaction request, wherein the memory is a nonvolatile memory and wherein the mode control logic is configured to when the volatile application direct mode is enabled, to restrict access to data written to the memory upon application of a power cycle to the memory to emulate volatile behavior of the memory.

In Example 22, the subject matter of Examples 18-25 (excluding the present Example) can optionally include wherein the plurality of potential memory modes of operation of the memory includes a storage mode in which the mode control logic is configured to read data from the memory in response to a memory block window register read transaction request, and to write data to the memory in response to a memory block window register write transaction request, and wherein the memory mode enablement logic is further configured to prevent access to the memory via block window registers to disable a storage mode associated with a memory block window register transaction request if it is determined that a storage mode associated with a memory block window register transaction request is not authorized.

In Example 23, the subject matter of Examples 18-25 (excluding the present Example) can optionally include wherein the plurality of potential memory modes of operation of the memory includes a non-volatile application direct mode in which the mode control logic is configured to read data from the memory in response to a memory read transaction request, and to write data to the memory in response to a memory write transaction request, wherein the memory is a nonvolatile memory and wherein mode control logic is further configured to when the non-volatile application direct mode is enabled, to permit access to data written to the memory notwithstanding application of a power cycle to the memory to implement non-volatile behavior of the memory.

In Example 24, the subject matter of Examples 18-25 (excluding the present Example) can optionally include wherein the central processing unit is configured to transmit to the memory interface logic, a memory transaction request and a system address for the memory transaction request, wherein the memory interface logic further includes memory control logic configured to transmit to the mode control logic, in response to a memory transaction request and a system address from the central processing unit, a memory transaction request together with a memory address, and wherein the memory control logic includes memory mode selection data generation logic configured to generate and transmit to the mode control logic, memory mode selection data which identifies a particular memory mode in which a memory transaction request associated with memory mode selection data, is to be performed by the memory.

In Example 25, the subject matter of Examples 18-25 (excluding the present Example) can optionally include at least one of:

a display communicatively coupled to the central processing unit, a network interface communicatively coupled to the central processing unit, and a battery coupled to provide power to the system.

Example 26 is an apparatus, comprising: memory interface logic having a memory and mode control logic means configured for receiving a memory transaction request and memory mode selection data associated with the memory transaction request and for performing a memory transaction request in a selected memory mode of operation of a plurality of potential memory modes of operation, if the selected memory mode of operation is enabled, said mode control logic means including: a mode authorization classification structure for a memory mode of operation of the plurality of potential memory modes of operation of the mode control logic means, wherein a mode authorization classification structure is configured to indicate whether an associated memory mode of operation is authorized, memory mode authorization logic means for comparing memory mode selection data associated with a memory transaction request to a mode authorization classification structure to determine if a selected memory mode associated with a memory transaction request is authorized, and memory mode enablement logic means for enabling the mode control logic means to operate in a selected memory mode associated with a memory transaction request if it is determined that the selected memory mode associated with the memory transaction request is authorized.

In Example 27, the subject matter of Examples 26-32 (excluding the present Example) can optionally include wherein the mode authorization classification structure of the mode control logic means further includes a fuse associated with a memory mode and configured to be set to indicate classification of a memory mode associated with the mode authorization classification structure as one of authorized and not authorized.

In Example 28, the subject matter of Examples 26-32 (excluding the present Example) can optionally include wherein the plurality of potential memory modes of operation of the mode control logic means includes a volatile read/write memory mode in which the mode control logic means is configured to read data from the memory in response to a memory read transaction request and to write data to the memory in response to a memory write transaction request, when enabled, wherein the memory is a non-volatile memory and wherein the mode control logic means is further configured to when the volatile read/write memory mode is enabled, to emulate volatile behavior of the memory to restrict access to data written to the memory upon application of a power cycle to the memory.

In Example 29, the subject matter of Examples 26-32 (excluding the present Example) can optionally include wherein the plurality of potential memory modes of operation of the mode control logic means includes a volatile application direct mode in which the mode control logic means is configured to read data from the memory in response to a memory read transaction request, and to write data to the memory in response to a memory write transaction request, wherein the memory is a nonvolatile memory and wherein the mode control logic means is configured to when the volatile application direct mode is enabled, to restrict access to data written to the memory upon application of a power cycle to the memory to emulate volatile behavior of the memory.

In Example 30, the subject matter of Examples 26-32 (excluding the present Example) can optionally include wherein the plurality of potential memory modes of operation of the memory includes a storage mode in which the mode control logic means is configured to read data from the memory in response to a memory block window register read transaction request, and to write data to the memory in response to a memory block window register write transaction request, and wherein the memory mode enablement logic means is further configured to prevent access to the memory via block window registers to disable a storage mode associated with a memory block window register transaction request if it is determined that a storage mode associated with a memory block window register transaction request is not authorized.

In Example 31, the subject matter of Examples 26-32 (excluding the present Example) can optionally include wherein the plurality of potential memory modes of operation of the memory includes a non-volatile application direct mode in which the mode control logic means is configured to read data from the memory in response to a memory read transaction request, and to write data to the memory in response to a memory write transaction request, wherein the memory is a nonvolatile memory and wherein mode control logic means is further configured to when the non-volatile application direct mode is enabled, to permit access to data written to the memory notwithstanding application of a power cycle to the memory to implement non-volatile behavior of the memory.

In Example 32, the subject matter of Examples 26-32 (excluding the present Example) can optionally be for use with a data transfer logic means configured to transmit to the memory interface logic, a memory transaction request and a system address for the memory transaction request, wherein the memory interface logic further includes memory control logic means configured to transmit to the mode control logic means, in response to a memory transaction request and a system address from the data transfer logic means, a memory transaction request together with a memory address, and wherein the memory control logic means includes memory mode selection data generation logic means configured to generate and transmit to the mode control logic means, memory mode selection data which identifies a particular memory mode in which a memory transaction request associated with memory mode selection data, is to be performed by the mode control logic means.

Example 33 is a computer program product for a computing system wherein the computer program product comprises a computer readable storage medium having program instructions embodied therewith, the program instructions executable by a processor of the computing system to cause operations, the operations comprising:

receiving by a memory, memory mode selection data indicating a memory mode in association with a memory transaction request, and comparing received memory mode selection data to a mode authorization classification structure to determine if a memory mode associated with a memory transaction request is authorized, wherein a mode authorization classification structure for a memory mode of a plurality of potential memory modes of operation of the memory, indicates whether an associated memory mode of operation is authorized.

In Example 34, the subject matter of Examples 33-40 (excluding the present Example) can optionally include wherein the operations further comprise enabling a memory mode associated with a memory transaction request if it is determined that the memory mode associated with the memory transaction request is authorized.

In Example 35, the subject matter of Examples 33-40 (excluding the present Example) can optionally include wherein the operations further comprise setting a fuse of the mode authorization classification structure to indicate classification of a memory mode for the mode authorization classification structure as one of authorized and not authorized.

In Example 36, the subject matter of Examples 33-40 (excluding the present Example) can optionally include wherein the plurality of potential memory modes of operation of the memory includes a volatile read/write memory mode in which data may be read from the memory in response to a memory read transaction request and in which data may be written to the memory in response to a memory write transaction request, wherein the memory is a nonvolatile memory and wherein the volatile read/write memory mode includes when enabled, emulating volatile behavior of the memory to restrict access to data written to the memory upon application of at least one of a system reset and a power cycle to the memory.

In Example 37, the subject matter of Examples 33-40 (excluding the present Example) can optionally include wherein the plurality of potential memory modes of operation of the memory includes a volatile application direct mode in which data may be read from the memory in response to a memory read transaction request, and in which data may be written to the memory in response to a memory write transaction request, wherein the memory is a nonvolatile memory and wherein the volatile application direct mode includes when enabled, emulating volatile behavior of the memory to restrict access to data written to the memory upon application of a power cycle to the memory.

In Example 38, the subject matter of Examples 33-40 (excluding the present Example) can optionally include wherein the plurality of potential memory modes of operation of the memory includes a storage mode in which data may be read from the memory in response to a memory block window register read transaction request, and in which data may be written to the memory in response to a memory block window register write transaction request, wherein the operations further comprise disabling a storage mode associated with a memory block window register transaction request if it is determined that a storage mode associated with a memory block window register transaction request is not authorized, and wherein the disabling a storage mode includes preventing access to the memory via block window registers.

In Example 39, the subject matter of Examples 33-40 (excluding the present Example) can optionally include wherein the plurality of potential memory modes of operation of the memory includes a non-volatile application direct mode in which data may be read from the memory in response to a memory read transaction request, and in which data may be written to the memory in response to a memory write transaction request, wherein the memory is a nonvolatile memory and wherein the non-volatile application direct mode includes when enabled, implementing non-volatile behavior of the memory to permit access to data written to the memory notwithstanding application of at least one of system reset and a power cycle to the memory.

In Example 40, the subject matter of Examples 33-40 (excluding the present Example) can optionally include wherein the operations further comprise a data transfer logic transmitting to a memory interface logic, a memory transaction request and a system address for the memory transaction request, transmitting to the memory, in response to a memory transaction request and a system address from the data transfer logic, a memory transaction request together with a memory address, and generating and transmitting to the memory, memory mode selection data which identifies a particular memory mode in which a memory transaction request associated with memory mode selection data, is to be performed by the memory.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus, comprising:
   memory interface logic having a memory and mode control logic configured to receive a memory transaction request and memory mode selection data associated with the memory transaction request and to perform a memory transaction request in a selected memory mode of operation of a plurality of potential memory modes of operation, if the selected memory mode of operation is enabled, said mode control logic including:
   a mode authorization classification structure for a memory mode of operation of the plurality of potential memory modes of operation of the mode control logic, wherein a mode authorization classification structure is configured to indicate whether an associated memory mode of operation is authorized;
   memory mode authorization logic configured to compare memory mode selection data associated with a memory transaction request to a mode authorization classification structure to determine if a selected memory mode associated with a memory transaction request is authorized; and
   memory mode enablement logic configured to enable the mode control logic to operate in a selected memory mode associated with a memory transaction request if it is determined that the selected memory mode associated with the memory transaction request is authorized.

2. The apparatus of claim 1 wherein the mode authorization classification structure of the mode control logic further includes a fuse associated with a memory mode and configured to be set to indicate classification of a memory mode associated with the mode authorization classification structure as one of authorized and not authorized.

3. The apparatus of claim 1 wherein the plurality of potential memory modes of operation of the mode control logic includes a volatile read/write memory mode in which the mode control logic is configured to read data from the memory in response to a memory read transaction request and to write data to the memory in response to a memory write transaction request, when enabled, wherein the memory is a nonvolatile memory and wherein the mode control logic is further configured to when the volatile read/write memory mode is enabled, to emulate volatile behavior of the memory to restrict access to data written to the memory upon application of a power cycle to the memory.

4. The apparatus of claim 1 wherein the plurality of potential memory modes of operation of the mode control logic includes a volatile application direct mode in which the mode control logic is configured to read data from the memory in response to a memory read transaction request, and to write data to the memory in response to a memory write transaction request, wherein the memory is a nonvolatile memory and wherein the mode control logic is configured to when the volatile application direct mode is enabled, to restrict access to data written to the memory upon application of a power cycle to the memory to emulate volatile behavior of the memory.

5. The apparatus of claim 1 wherein the memory has a plurality of block window registers and the plurality of potential memory modes of operation of the memory includes a storage mode in which the mode control logic is configured to read data from the memory via a block window register in response to a memory block window register read transaction request, and to write data to the memory via a block window register in response to a memory block window register write transaction request, and wherein the memory mode enablement logic is further configured to prevent access to the memory via block window registers to disable a storage mode associated with a memory block window register transaction request if it is determined that a storage mode associated with a memory block window register transaction request is not authorized.

6. The apparatus of claim 1 wherein the plurality of potential memory modes of operation of the memory includes a non-volatile application direct mode in which the mode control logic is configured to read data from the memory in response to a memory read transaction request, and to write data to the memory in response to a memory write transaction request, wherein the memory is a nonvolatile memory and wherein mode control logic is further configured to when the non-volatile application direct mode is enabled, to permit access to data written to the memory notwithstanding application of a power cycle to the memory to implement non-volatile behavior of the memory.

7. The apparatus of claim 1 for use with a data transfer logic configured to transmit to the memory interface logic, a memory transaction request and a system address for the memory transaction request, wherein the memory interface logic further includes memory control logic configured to transmit to the mode control logic, in response to a memory transaction request and a system address from the data transfer logic, a memory transaction request together with a memory address, and wherein the memory control logic includes memory mode selection data generation logic configured to generate and transmit to the mode control logic, memory mode selection data which identifies a particular memory mode in which a memory transaction request associated with memory mode selection data, is to be performed by the mode control logic.

8. A method, comprising:
   receiving by a memory, memory mode selection data indicating a memory mode in association with a memory transaction request; and
   comparing received memory mode selection data to a mode authorization classification structure to determine if a memory mode associated with a memory transaction request is authorized, wherein a mode authorization classification structure for a memory mode of a plurality of potential memory modes of operation of the memory, indicates whether an associated memory mode of operation is authorized.

9. The method of claim 8 further comprising enabling a memory mode associated with a memory transaction request if it is determined that the memory mode associated with the memory transaction request is authorized.

10. The method of claim 8 further comprising setting a fuse of the mode authorization classification structure to indicate classification of a memory mode for the mode authorization classification structure as one of authorized and not authorized.

11. The method of claim 8 wherein the plurality of potential memory modes of operation of the memory includes a volatile read/write memory mode in which data may be read from the memory in response to a memory read transaction request and in which data may be written to the memory in response to a memory write transaction request, wherein the memory is a nonvolatile memory and wherein the volatile read/write memory mode includes when enabled, emulating volatile behavior of the memory to restrict access to data written to the memory upon application of at least one of a system reset and a power cycle to the memory.

12. The method of claim 8 wherein the plurality of potential memory modes of operation of the memory includes a volatile application direct mode in which data may be read from the memory in response to a memory read transaction request, and in which data may be written to the memory in response to a memory write transaction request, wherein the memory is a nonvolatile memory and wherein the volatile application direct mode includes when enabled, emulating volatile behavior of the memory to restrict access to data written to the memory upon application of a power cycle to the memory.

13. The method of claim 8 wherein the plurality of potential memory modes of operation of the memory includes a storage mode in which data may be read from the memory via a block window register in response to a memory block window register read transaction request, and in which data may be written to the memory via a block window register in response to a memory block window register write transaction request, wherein the method further includes disabling a storage mode associated with a memory block window register transaction request if it is determined that a storage mode associated with a memory block window register transaction request is not authorized, and wherein the disabling a storage mode includes preventing access to the memory via block window registers.

14. The method of claim 8 wherein the plurality of potential memory modes of operation of the memory includes a non-volatile application direct mode in which data may be read from the memory in response to a memory read transaction request, and in which data may be written to the memory in response to a memory write transaction request, wherein the memory is a nonvolatile memory and wherein the non-volatile application direct mode includes when enabled, implementing non-volatile behavior of the memory to permit access to data written to the memory notwithstanding application of at least one of system reset and a power cycle to the memory.

15. The method of claim 8 further comprising a data transfer logic transmitting to a memory interface logic, a memory transaction request and a system address for the memory transaction request, transmitting to the memory, in response to a memory transaction request and a system address from the data transfer logic, a memory transaction request together with a memory address, and generating and transmitting to the memory, memory mode selection data which identifies a particular memory mode in which a memory transaction request associated with memory mode selection data, is to be performed by the memory.

16. A system, comprising:
a central processing unit; and
memory interface logic having a memory and mode control logic configured to receive a memory transaction request and memory mode selection data associated with the memory transaction request and to perform a memory transaction request in a selected memory mode of operation of a plurality of potential memory modes of operation, if the selected memory mode of operation is enabled, said mode control logic including:
a mode authorization classification structure for a memory mode of operation of the plurality of potential memory modes of operation of the mode control logic, wherein a mode authorization classification structure is configured to indicate whether an associated memory mode of operation is authorized;
memory mode authorization logic configured to compare memory mode selection data associated with a memory transaction request to a mode authorization classification structure to determine if a selected memory mode associated with a memory transaction request is authorized; and
memory mode enablement logic configured to enable the mode control logic to operate in a selected memory mode associated with a memory transaction request if it is determined that the selected memory mode associated with the memory transaction request is authorized.

17. The system of claim 16 wherein the mode authorization classification structure of the mode control logic further includes a fuse associated with a memory mode and configured to be set to indicate classification of a memory mode associated with the mode authorization classification structure as one of authorized and not authorized.

18. The system of claim 16 wherein the plurality of potential memory modes of operation of the mode control logic includes a volatile read/write memory mode in which the mode control logic is configured to read data from the memory in response to a memory read transaction request and to write data to the memory in response to a memory write transaction request, when enabled, wherein the memory is a nonvolatile memory and wherein the mode control logic is further configured to when the volatile read/write memory mode is enabled, to emulate volatile behavior of the memory to restrict access to data written to the memory upon application of a power cycle to the memory.

19. The system of claim 16 wherein the plurality of potential memory modes of operation of the mode control logic includes a volatile application direct mode in which the mode control logic is configured to read data from the memory in response to a memory read transaction request, and to write data to the memory in response to a memory write transaction request, wherein the memory is a nonvolatile memory and wherein the mode control logic is configured to when the volatile application direct mode is enabled, to restrict access to data written to the memory upon application of a power cycle to the memory to emulate volatile behavior of the memory.

20. The system of claim 16 wherein the memory has a plurality of block window registers and the plurality of potential memory modes of operation of the memory includes a storage mode in which the mode control logic is configured to read data from the memory via a block window register in response to a memory block window register read transaction request, and to write data to the memory via a block window register in response to a memory block window register write transaction request, and wherein the memory mode enablement logic is further configured to prevent access to the memory via block window registers to disable a storage mode associated with a memory block window register transaction request if it is determined that a storage mode associated with a memory block window register transaction request is not authorized.

21. The system of claim 16 wherein the plurality of potential memory modes of operation of the memory includes a non-volatile application direct mode in which the mode control logic is configured to read data from the memory in response to a memory read transaction request, and to write data to the memory in response to a memory write transaction request, wherein the memory is a nonvolatile memory and wherein mode control logic is further configured to when the non-volatile application direct mode is enabled, to permit access to data written to the memory notwithstanding application of a power cycle to the memory to implement non-volatile behavior of the memory.

22. The system of claim 16 wherein the central processing unit is configured to transmit to the memory interface logic, a memory transaction request and a system address for the memory transaction request, wherein the memory interface logic further includes memory control logic configured to transmit to the mode control logic, in response to a memory transaction request and a system address from the central processing unit, a memory transaction request together with a memory address, and wherein the memory control logic includes memory mode selection data generation logic configured to generate and transmit to the mode control logic, memory mode selection data which identifies a particular memory mode in which a memory transaction request associated with memory mode selection data, is to be performed by the memory.

23. The system of claim 22 further comprising at least one of:
  a display communicatively coupled to the central processing unit, a network interface communicatively coupled to the central processing unit, and a battery coupled to provide power to the system.

* * * * *